United States Patent
Okamoto et al.

(10) Patent No.: US 10,826,098 B2
(45) Date of Patent: Nov. 3, 2020

(54) COMPOSITE POLYMER ELECTROLYTE MEMBRANE, MEMBRANE ELECTRODE ASSEMBLY AND SOLID POLYMER FUEL CELL USING SAME

(71) Applicants: Toray Industries, Inc., Tokyo (JP); Japan Vilene Company, Ltd., Tokyo (JP)

(72) Inventors: Yumiko Okamoto, Otsu (JP); Daisuke Izuhara, Otsu (JP); Junpei Yamaguchi, Otsu (JP); Shusuke Shirai, Otsu (JP); Tomoyuki Kunita, Otsu (JP); Hiroaki Umeda, Otsu (JP); Yuuta Wakamoto, Koga (JP); Tatsunori Ito, Koga (JP); Noriko Michihata, Koga (JP); Takashi Tarao, Koga (JP)

(73) Assignees: Toray Industries, Inc., Tokyo (JP); Japan Vilene Company, Ltd., Tokyo (JP)

( * ) Notice: Subject to any disclaimer, the term of this patent is extended or adjusted under 35 U.S.C. 154(b) by 176 days.

(21) Appl. No.: 16/077,861

(22) PCT Filed: Feb. 13, 2017

(86) PCT No.: PCT/JP2017/005176
§ 371 (c)(1),
(2) Date: Aug. 14, 2018

(87) PCT Pub. No.: WO2017/141878
PCT Pub. Date: Aug. 24, 2017

(65) Prior Publication Data
US 2020/0091532 A1    Mar. 19, 2020

(30) Foreign Application Priority Data
Feb. 18, 2016 (JP) .................... 2016-029079

(51) Int. Cl.
*H01M 8/103* (2016.01)
*H01M 8/1044* (2016.01)
(Continued)

(52) U.S. Cl.
CPC ........ *H01M 8/1004* (2013.01); *D04H 1/4366* (2013.01); *D04H 1/551* (2013.01);
(Continued)

(58) Field of Classification Search
None
See application file for complete search history.

(56) References Cited

U.S. PATENT DOCUMENTS

| | | |
|---|---|---|
| 2009/0127735 A1 | 5/2009 | Chokai et al. |
| 2013/0101918 A1* | 4/2013 | Yandrasits .......... H01M 8/1069 429/482 |

FOREIGN PATENT DOCUMENTS

| | | |
|---|---|---|
| JP | 2001-510879 A | 8/2001 |
| JP | 2004-217715 A | 8/2004 |

(Continued)

OTHER PUBLICATIONS

Machine translation of JP 2012-238590, Dec. 2012.*

*Primary Examiner* — Jonathan Crepeau
(74) *Attorney, Agent, or Firm* — DLA Piper LLP (US)

(57) ABSTRACT

A composite polymer electrolyte membrane has a high proton conductivity even under low-humidity, low-temperature conditions, a reduced dimensional change rate, a high mechanical strength and high chemical stability, and produces a solid polymer electrolyte fuel cell with a high output and high physical durability, a membrane electrode assembly, and a solid polymer electrolyte fuel cell containing the same. This composite polymer electrolyte membrane contains a composite layer composed mainly of a polyazole-containing nanofiber nonwoven fabric (A) and an ionic
(Continued)

(M1)

(M2)

(M3)

(M4)

group-containing polymer electrolyte (B), the polyazole-containing nanofiber nonwoven fabric (A) being basic.

18 Claims, 1 Drawing Sheet

(51) Int. Cl.

| | | |
|---|---|---|
| H01M 8/1081 | (2016.01) | |
| D04H 1/551 | (2012.01) | |
| D04H 1/728 | (2012.01) | |
| D04H 1/4366 | (2012.01) | |
| H01M 8/1004 | (2016.01) | |
| H01M 8/1086 | (2016.01) | |
| H01M 8/1018 | (2016.01) | |

(52) U.S. Cl.
CPC ............ *D04H 1/728* (2013.01); *H01M 8/103* (2013.01); *H01M 8/1044* (2013.01); *H01M 8/1081* (2013.01); *H01M 8/1086* (2013.01); *H01M 2008/1095* (2013.01)

(56) References Cited

FOREIGN PATENT DOCUMENTS

| | | |
|---|---|---|
| JP | 2004-288495 A | 10/2004 |
| JP | 2007-266311 A | 10/2007 |
| JP | 2012-238590 A | 12/2012 |
| JP | 2013-062240 A | 4/2013 |
| JP | 2013-531867 A | 8/2013 |
| WO | 2006/087995 A1 | 8/2006 |
| WO | 2015/133594 A1 | 9/2015 |

* cited by examiner

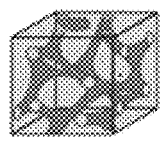 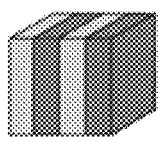 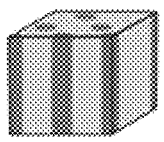 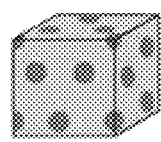
(M1)　　(M2)　　(M3)　　(M4)

COMPOSITE POLYMER ELECTROLYTE MEMBRANE, MEMBRANE ELECTRODE ASSEMBLY AND SOLID POLYMER FUEL CELL USING SAME

TECHNICAL FIELD

This disclosure relates to a composite polymer electrolyte membrane having a composite layer formed by combining a polymer electrolyte and a nanofiber nonwoven fabric, a membrane electrode assembly, and a solid polymer electrolyte fuel cell.

BACKGROUND

A fuel cell is a kind of power generator that extracts electric energy through electrochemical oxidation of fuels such as hydrogen and methanol and, in recent years, the fuel cell has drawn attention as a clean energy supply source. Among others, the solid polymer electrolyte fuel cell, which normally works at a low operating temperature around 100° C. and has a high energy density, is expected to serve in a wide variety of fields such as relatively small distributed power generation facilities and power generation equipment for movable bodies such as automobiles and ships. In addition, the polymer electrolyte fuel cell also draws attention as a power source for small scale mobile apparatuses and portable apparatuses, and is expected to serve effectively on cell phones, personal computers and the like, to replace secondary batteries such as nickel hydrogen battery and lithium ion battery.

A fuel cell is normally in the form of a cell unit containing a membrane electrode assembly (hereinafter occasionally referred to as MEA) sandwiched between separators, the MEA being composed of an anode electrode and a cathode electrode where a reaction for power generation occurs and a polymer electrolyte membrane that serves as proton conductor between the anode and the cathode. Conventionally, membranes of Nafion (registered trademark, manufactured by DuPont), which is a perfluorosulfonic acid based polymer, has been widely used as the polymer electrolyte membrane. However, although polymer electrolyte membranes of Nafion (registered trademark) can exhibit high proton conductivity even under low-humidify conditions due to the existence of proton-conducting channels resulting from a cluster structure, it has the problem of extremely high prices attributable to manufacturing through multistage synthesis and a large fuel crossover attributable to the above-mentioned cluster structure. Furthermore, problems relating to waste disposal after use and difficulty in recycling the material have also been pointed out.

To tackle the issues, active studies have been carried out in recent years to develop hydrocarbon based polymer electrolyte membranes that are so low in price and good in membrane characteristics that they can replace Nafion (registered trademark) (see, for example, International Publication WO 2006/087995). However, hydrocarbon based polymer electrolyte membranes tend to significantly undergo large dimensional changes in dry-wet cycles, and techniques that reduce such dimensional changes have been sought after to realize improved physical durability.

To provide an electrolyte membrane for fuel cells that suffers less dimensional changes in dry-wet cycles, attempts have been made to develop composite materials composed of a reinforcing material and a polymer electrolyte material. Japanese Unexamined Patent Publication (Kokai) No. 2013-62240 proposes a composite polymer electrolyte membrane containing an electrolyte membrane reinforced with a porous polytetrafluoroethylene based material. Japanese Unexamined Patent Publication (Kokai) No. 2004-217715 proposes a composite polymer electrolyte membrane containing an electrolyte membrane reinforced with a porous polybenzasole based polymer. To depress such dimensional changes effectively, Japanese Unexamined Patent Publication (Kokai) No. 2012-238590 proposes a composite polymer electrolyte membrane containing a sulfonated polyimide, used as polymer electrolyte material, in combination with a nonwoven polybenzimidazole nanofiber fabric containing a doped phosphoric acid to serve as a proton transport site.

The composite polymer electrolyte membrane described in JP '240, however, suffers poor affinity between the hydrocarbon based electrolyte and the porous polytetrafluoroethylene material and the resulting composite electrolyte membrane contains many voids, leading to poor fuel permeation and low mechanical strength. For the composite polymer electrolyte membrane described in JP '715, although a high affinity can be expected from the use of a porous polybenzoxazole material, which is a hydrocarbon based polymer, the porous material used, which was produced by wet coagulation, was low in uniformity and, accordingly, the less dense portions of the porous material were likely to break in dry-wet cycles that can occur in operating fuel cells, possibly leading to pinholes in the composite polymer electrolyte membrane. For the composite polymer electrolyte membrane described in JP '590, although a highly uniform polybenzimidazole nanofiber nonwoven fabric is used as the porous material, the nanofiber nonwoven fabric is coated with a phosphoric acid or the like to improve the proton conductivity and, accordingly, elution of the phosphoric acid occasionally occurred during power generation, leading to a decrease in the durability of the composite polymer electrolyte membrane. Furthermore, the problem of low proton conductivity occurred when acid doping was not performed.

There is therefore a need to provide a composite polymer electrolyte membrane having a high proton conductivity even under low-humidity, low-temperature conditions, has a reduced dimensional change rate, a high mechanical strength and high chemical stability, and produces a solid polymer electrolyte fuel cell with a high output and high physical durability, and also provides a membrane electrode assembly and a solid polymer electrolyte fuel cell containing the same.

SUMMARY

We thus provide a composite polymer electrolyte membrane having a composite layer composed mainly of a polyazole-containing nanofiber nonwoven fabric (A) and an ionic group-containing polymer electrolyte (B), the polyazole-containing nanofiber nonwoven fabric (A) being basic.

The composite polymer electrolyte membrane, membrane electrode assembly, and solid polymer electrolyte fuel cell containing the same have a high proton conductivity even under low-humidity, low-temperature conditions, a reduced dimensional change rate, a high mechanical strength and high chemical stability, and produce a solid polymer electrolyte fuel cell with a high output and high physical durability.

BRIEF DESCRIPTION OF THE DRAWINGS

FIG. 1 includes illustrative diagrams (M1) to (M4) schematically showing states of phase separation structures in the ionic group-containing polymer electrolyte (B), (M1) showing an example of a co-continuous type structure, (M2) showing an example of a lamella type structure, (M3) showing an example of a cylindrical structure, and (M4) showing an example of a sea-island structure.

DETAILED DESCRIPTION

Our membranes, assemblies and fuel cells are described in more detail below. When a range is defined by two figures with a "-" or "to" in between, the range is inclusive of the figures.

In our composite polymer electrolyte membrane having a high proton conductivity even under low-humidity, low-temperature conditions, a reduced dimensional change rate, a high mechanical strength and high chemical stability, and producing a solid polymer electrolyte fuel cell with a high output and high physical durability, we found that the dimensional change rate and physical durability of the electrolyte membrane largely depend on the type of the porous material and the component polymer of the porous material and also that the proton conductivity largely depends on the phase separation structure of the polymer electrolyte material in the porous material. In other words, we provide a composite polymer electrolyte membrane having a composite layer composed mainly of a polyazole-containing nanofiber nonwoven fabric (A) and an ionic group-containing polymer electrolyte (B), the polyazole-containing nanofiber nonwoven fabric (A) being basic.

Polyazole-Containing Nanofiber Nonwoven Fabric (A)

The composite polymer electrolyte membrane has a composite layer composed mainly of a basic polyazole-containing nanofiber nonwoven fabric (A) (hereinafter occasionally referred to as polyazole based nanofiber nonwoven fabric, nanofiber nonwoven fabric, or, more simply, nonwoven fabric) and an ionic group-containing polymer electrolyte (B) (hereinafter occasionally referred to as polymer electrolyte material or polymer electrolyte).

The term "basic polyazole based nanofiber nonwoven fabric" herein refers to a nonwoven fabric formed of nanofibers of a polyazole based polymer having an azole structure in the polymer chain, and a basicity attributed to the azole structure develops without performing treatment with an acidic substance such as phosphoric acid. We believe that when a basic polyazole based polymer is used, the nitrogen atoms in the polyazole based polymer and the ionic groups in the polymer electrolyte material undergo acid-base interaction to enhance the affinity between the nonwoven fabric and the polymer electrolyte material. Therefore, the polyazole based nanofiber nonwoven fabric is combined with an aromatic hydrocarbon based polymer electrolyte into a composite structure under basic conditions without performing the doping of an acidic substance, as described later.

The term "polyazole based polymer" collectively refers to those polymers having an azole structure in the main chain. The term "azole structure" refers to a compound having a five-membered heterocyclic ring structure that has one or more nitrogen atoms in the ring. The above five-membered heterocyclic ring may contain other atoms such as oxygen and sulfur in addition to nitrogen. Examples of the polyazoles include, but not limited to, polyimidazole, polybenzoxazole, polybenzothiazole, polybenzimidazole, polybenzopyrazole, polybenzopyrrole, and polybenzofurazan. Of these, polybenzazoles such as polybenzoxazole, polybenzothiazole, and polybenzimidazole are preferred from the viewpoint of availability, and in particular, polybenzimidazole is more preferred because of having high-basicity nitrogen atoms.

The term "polybenzimidazole" refers to polymers containing repeating units as represented by formula (1-1) or (1-2) given below. A polybenzimidazole may contain both repeating units as represented by formula (1-1) and those as represented by formula (1-2):

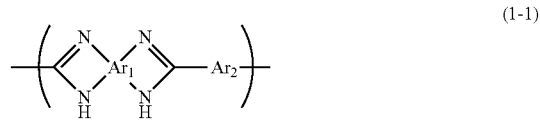

(1-1)

(1-2)

In formula (1-1), $Ar_1$ is a tetravalent group containing at least one aromatic ring, and $Ar_2$ is a divalent group containing at least one aromatic ring. In formula (1-2), $Ar_3$ is a trivalent group containing at least one aromatic ring. $Ar_1$, $Ar_2$, and $Ar_3$ may each be substituted by an aliphatic group, aromatic group, halogen group, hydroxyl group, nitro group, cyano group, or trifluoromethyl group.

Each aromatic ring contained in $Ar_1$, $Ar_2$, or $Ar_3$ may be a monocyclic ring such as benzene ring, or a condensed ring such as naphthalene, anthracene, and pyrene. It may be an aromatic hydrocarbon ring or an aromatic heterocyclic ring containing N, O, or S as a component atom of the aromatic ring.

In formula (1-1), $Ar_1$ is preferably a group as represented by formula (2-1) or (2-2) given below:

(2-1)

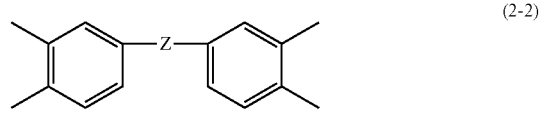

(2-2)

In formula (2-1), $Y_1$ and $Y_2$ each represent either CH or N. In chemical formula 2-2, Z represents direct bonding, —O—, —S—, —SO$_2$—, —C(CH$_3$)$_2$—, —C(CF$_3$)$_2$—, or —CO—.

In formula (1-1), furthermore, $Ar_2$ is preferably a group selected from the divalent groups represented by any of the formulae below:

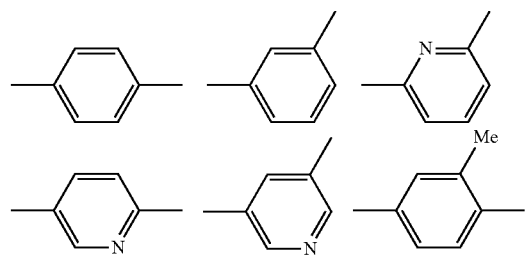

-continued

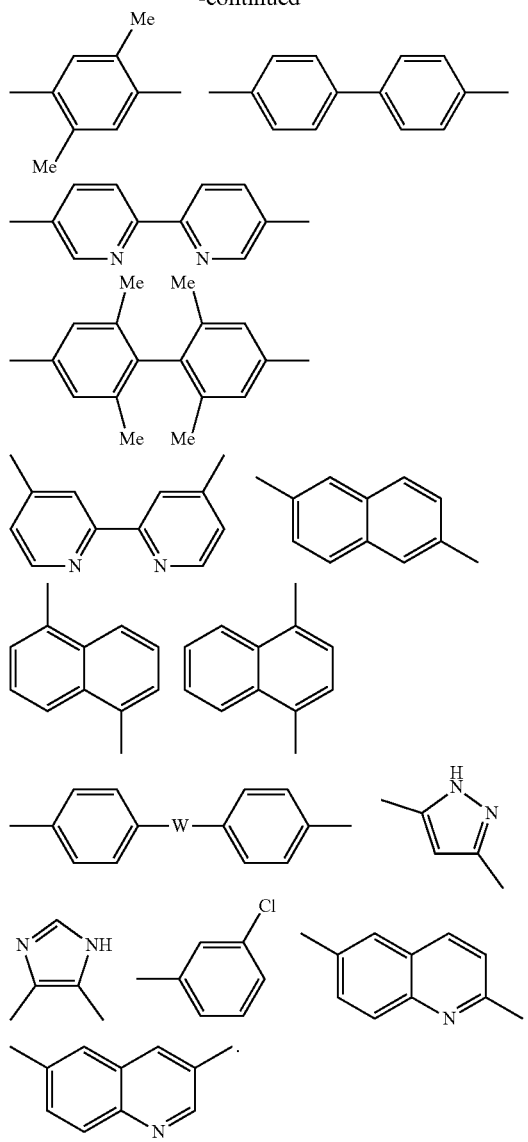

In the above formulae, W represents —O—, —S—, —SO$_2$—, —C(CH$_3$)$_2$—, —C(CF$_3$)$_2$—, or —CO—, and Me represents methyl.

In formula (1-2), furthermore, Ar$_3$ is preferably a trivalent group as represented by the formula below:

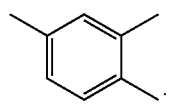

The polybenzimidazole to be used may be a homopolymer containing only those repeating units as represented by formula (1-1) or (1-2) or a random copolymer, alternating copolymer, or block copolymer containing a combination of different repeating units having different structures.

Specific examples of the repeating units represented by formula (1-1) or (1-2) include those represented by any of the formulae below:

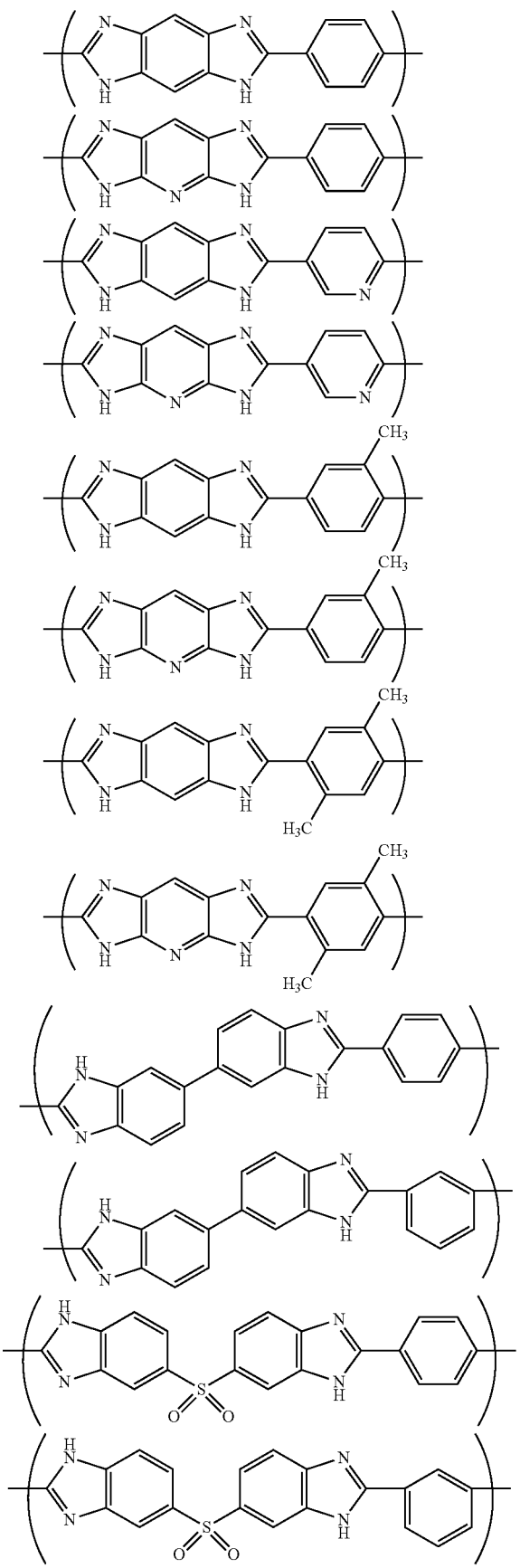

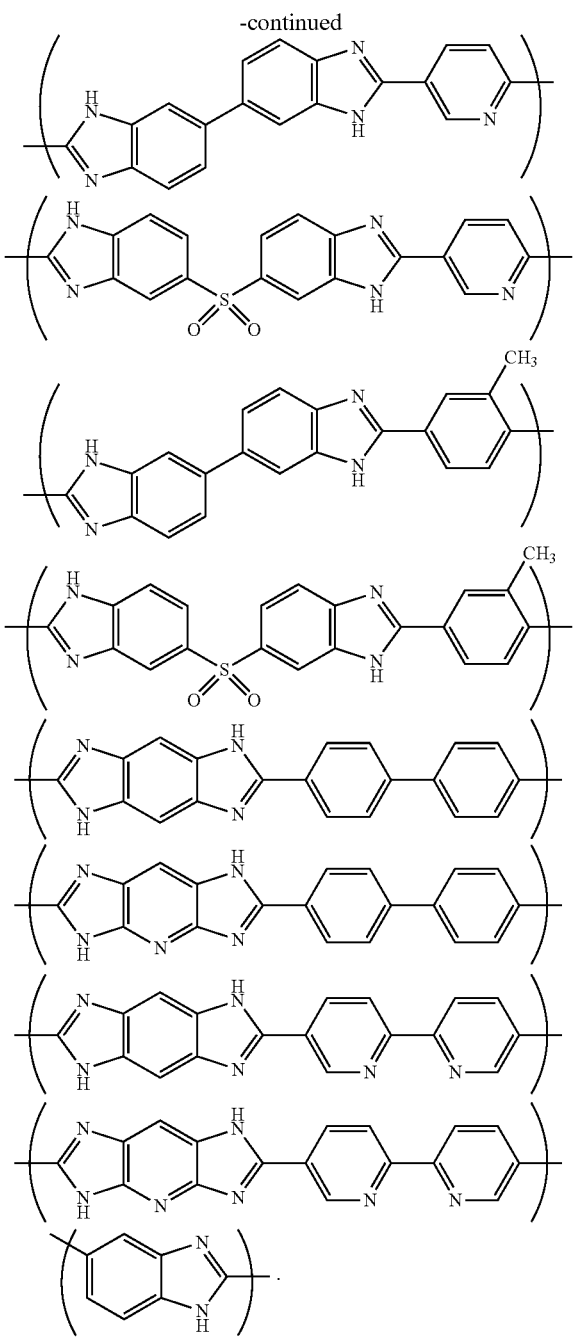

The polyazole based polymer to be used may contain an additional constituent unit other than those repeating units represented by formula (1-1) or (1-2) and may be a random copolymer, alternating copolymer, or block copolymer with additional polymer constituent units, as long as a sufficient basicity is maintained. Such additional constituent units include polyimide based constituent units, polyamide based constituent units, polyamide-imide based constituent units, polyoxydiazole based constituent units, polyazomethine based constituent units, polybenzasole imide based constituent units, polyetherketone based constituent units, and polyethersulfone based constituent units, and their addition is preferred because they can improve the mechanical characteristics.

It is preferable for the polyazole-containing nanofiber nonwoven fabric (A) to contain 80 wt % or more polyazole, more preferably containing 90 wt % or more polyazole, and still more preferably containing 95 wt % or more polyazole. In particular, it is preferable for the nanofiber nonwoven fabric to be formed only of polyazole because it ensures a high mechanical strength and enhanced dimensional change reduction effect. A polyazole content of less than 80 wt % may lead to an insufficient dynamic strength or insufficient dimensional change reduction effect.

After being immersed for 1 hour in N-methyl-2-pyrolidone at 30° C., the polyazole-containing nanofiber nonwoven fabric (A) preferably has a weight change rate of 50% or less, more preferably 30% or less, and particularly preferably 20% or less. If the weight change rate is more than 50%, the nanofiber nonwoven fabric may be dissolved in the membrane production process, possibly leading to insufficient dimensional change reduction effect. Furthermore, after being immersed for 1 hour in N-methyl-2-pyrolidone at 80° C., the polyazole-containing nanofiber nonwoven fabric (A) preferably has a weight change rate of 50% or less, more preferably 30% or less, and particularly preferably 20% or less. If the weight change rate is more than 50%, the nanofiber nonwoven fabric may be dissolved in the membrane production process, particularly in the solvent drying step, possibly leading to insufficient dimensional change reduction effect.

After being immersed for 1 hour in N-methyl-2-pyrolidone at 30° C., the polyazole-containing nanofiber nonwoven fabric (A) preferably has a dimensional change rate of 20% or less, more preferably 10% or less, and particularly preferably 5% or less. If the dimensional change rate is more than 20%, the nanofiber nonwoven fabric may be shrunk to cause wrinkles in the membrane production process, possibly making it impossible to form a uniform membrane. After being immersed for 1 hour in N-methyl-2-pyrolidone at 80° C., the polyazole-containing nanofiber nonwoven fabric (A) preferably has a dimensional change rate of 20% or less, more preferably 10% or less, and particularly preferably 5% or less. If the dimensional change rate is more than 20%, the nanofiber nonwoven fabric may be shrunk to cause wrinkles in the membrane production process, particularly in the solvent drying step, possibly making it impossible to form a uniform membrane.

When examined by X-ray diffraction, the polyazole-containing nanofiber nonwoven fabric (A) preferably has a half-width 2θ of 10° or more, more preferably showing a half-width 2θ of 110 or more. If the nanofiber nonwoven fabric to be used has a half-width of 10° or more, it will be possible to produce a composite polymer electrolyte membrane with further reduced dimensional changes. Although details of the mechanism are not known clearly, we believe it is because the mechanical strength is improved due to crosslinking of polyazole molecules.

The polyazole-containing nanofiber nonwoven fabric (A) preferably has a Kubelka-Munk value, as calculated from reflected light spectra, of 0.35 or more, more preferably 0.40 or more, and still more preferably 0.45 or more for a light of 450 nm. If the nanofiber nonwoven fabric to be used has a Kubelka-Munk value of 0.35 or more, it will be possible to produce a composite polymer electrolyte membrane with further reduced dimensional changes. Although details of the mechanism are not known clearly, we believe it is because the mechanical strength is improved due to crosslinking of polyazole molecules.

In the emission spectrum analysis of the polyazole-containing nanofiber nonwoven fabric (A), the ratio (I450/I300) of the peak intensity I450 in the emission spectrum obtained when excited by a light of 450 nm to the peak intensity I300 in the emission spectrum obtained when excited by a light of 300 nm is preferably 0.30 or more, more preferably 0.35 or more, and particularly preferably 0.40 or more. Furthermore, the I450/I300 ratio is preferably 1.40 or less, more preferably 1.20 or less, and particularly preferably 1.00 or less. If the nanofiber nonwoven fabric to be used has a I450/I300 ratio of 0.30 or more and 1.40 or less, it will be possible to produce a composite polymer electrolyte membrane with further reduced dimensional changes. Although details of the mechanism are not known clearly, we believe it is because in the nanofiber nonwoven fabric having a I450/I300 ratio of 0.30 or more and 1.40 or less, the polyazole molecules form an intermolecular crosslinked structure and the conjugation of the polymer chains is expanded so that the absorption/emission spectra shift toward the longer wavelength side to give a I450/I300 ratio within the above range. Thus, formation of the aforementioned crosslinked structure improves the mechanical strength. A I450/I300 ratio of less than 0.30 will lead to a less firmly developed crosslinked structure, a smaller shift of the absorption/emission spectrum toward the longer wavelength side, and a smaller peak intensity observed when excited by a light of 450 nm and, accordingly, the aforementioned nonwoven fabric will fail to form a sufficiently developed crosslinked structure, possibly resulting in an insufficient mechanical strength. An I450/I300 ratio of more than 1.40, on the other hand, can lead to an excessively crosslinked structure and a stiff and brittle polyazole-containing nanofiber nonwoven fabric, possibly resulting in deterioration in processability or dimensional change reduction capability.

It is preferable for the polyazole based nanofibers contained in the polyazole based nanofiber nonwoven fabric to be in the form of polyazole based polymer fibers having a fiber diameter of a nanometer order, that is, 1 nm or more and less than 1 am. It is preferable for the polyazole based nanofibers to be in the fiber diameter range of 50 nm to 800 nm, more preferably 50 nm to 500 nm, and still more preferably 50 to 200 nm. A fiber diameter of less than 50 nm can lead to an insufficient dynamic strength and an insufficient dimensional change reduction effect, whereas a fiber diameter of more than 800 nm tends to make it difficult to prepare a nonwoven fabric with a uniform thickness. It is preferable to use a polyazole based nanofiber nonwoven fabric containing polybenzasole based nanofibers in the fiber diameter range of 50 nm to 500 nm.

There are no specific limitations on the thickness of the polyazole based nanofiber nonwoven fabric to be used. It depends on the intended uses of the composite polymer electrolyte membrane, but practical membranes normally have a thickness of 0.5 to 50 m.

There are no specific limitations on the porosity that the nanofiber nonwoven fabric has before being combined with a polymer electrolyte material, it is preferably 50% to 98%, more preferably 80% to 98%, from the viewpoint of ensuring formation of a composite polymer electrolyte membrane having both a required proton conductivity and a required mechanical strength. The porosity Y1 (vol %) of a polyazole based nanofiber nonwoven fabric is determined by the equation below:

$$Y1 = (1 - Db/Da) \times 100$$

Da: specific gravity of the fibers contained in the polyazole based nanofiber nonwoven fabric
Db: specific gravity of the entire polyazole based nanofiber nonwoven fabric including the porous portions.

The size of the pores in the polyazole based nanofiber nonwoven fabric, that is, the average distance between fibers observed through the surface of the nanofiber nonwoven fabric by scanning electron microscopy is preferably 100 nm or more and 2,000 nm or less, more preferably 100 nm or more and 1,000 nm or less. A pore size of more than 2,000 nm can lead to an insufficient dimensional change reduction effect, whereas a pore size of less than 100 nm can lead to a failure in allowing the polymer electrolyte material to form a co-continuous phase separation structure, possibly resulting in a decrease in proton conductivity. It is also preferable for the pore size to be larger than the undermentioned average interdomain distance in the polymer electrolyte material, because it serves to reduce the frequency of the fibers impeding the proton paths formed by ionic domains of the phase separation structure. The pore size referred to herein was measured by the method described in Item (9) under EXAMPLES.

The pore size of polyazole based nanofibers is preferably 2 to 200 times, more preferably 10 to 100 times, as large as the phase-separated interdomain distance in the polymer electrolyte material. If it is less than 2 times, a co-continuous phase separation structure may not be formed, leading to a decreased proton conductivity, whereas if it is more than 200 times, it may be impossible to realize a sufficient dimensional change reduction effect.

There are no specific limitations on the method to be used to produce the polyazole-containing nanofiber nonwoven fabric (A), but it is preferable to carry out its production according to steps 1 to 3 described below from the viewpoint of realizing an enhanced dimensional change reduction effect on the composite polymer electrolyte membrane.

Specifically, they are:
Step 1: Dissolving the starting polymers for the polyazole-containing nanofiber nonwoven fabric,
Step 2: Producing a nanofiber nonwoven fabric precursor by electrospinning of the solution resulting from step 1, and
Step 3: Performing insolubilization treatment of the nanofiber nonwoven fabric precursor resulting from step 2.

For the insolubilization treatment in step 3, it is more preferable to perform heat treatment at a temperature T(° C.) that meets equation (F1) below:

$$Tg1-50(° C.) \leq T \leq Tg1+20(° C.) \tag{F1}$$

In equation (F1), Tg1 denotes the glass transition temperature (° C.) of the polyazole contained in the polyazole-containing nanofiber nonwoven fabric.

A sufficient dimensional change reduction effect may not be realized if heat treatment is performed at a temperature of less than Tg1−50(° C.) in step 3 for insolubilized treatment. If heat treatment is performed at a temperature of more than Tg1+20(° C.), on the other hand, the resulting nonwoven fabric will be stiff and brittle and the processability will deteriorate considerably, possibly leading to difficulty in membrane production.

In the aforementioned step 3 for insolubilization treatment, it is more preferable to heat-treat the polyazole-containing nanofiber nonwoven fabric after placing it on a base material having a glass transition temperature of Tg2 (° C.) that meets equation (F2) below (or melting point Tm (° C.) in a base material of a substance that does not have a glass transition point):

$$Tg2(Tm) > T \tag{F2}$$

In equation (F2), Tg2 is the glass transition temperature (° C.) of the substance of the base and Tm (° C.) is the melting point of the substance of the base.

There are no specific limitations on the aforementioned base material as long as it meets equation (F2), but preferable ones include polyimide membrane, glass, and stainless steel.

The use of a nanofiber nonwoven fabric prepared according to the above production method can produce a composite polymer electrolyte membrane that suffers fewer dimensional changes. Although details of the mechanism are not known clearly, we believe it is because the mechanical strength is improved due to crosslinking of polyazole molecules.

Ionic Group-Containing Polymer Electrolyte (B)

Next, the ionic group-containing polymer electrolyte (B) (polymer electrolyte material) will be described.

The ionic group-containing polymer electrolyte (B) may be either a perfluoro-type polymer or a hydrocarbon based polymer as long as it can meet requirements for both power generation characteristics and chemical stability.

The perfluoro-type polymer herein means a polymer in which most or all of the hydrogen atoms in the alkyl groups and/or the alkylene groups are substituted by fluorine atoms. Good examples of the perfluoro-type polymer containing an ionic group include commercial products such as Nafion (registered trademark, manufactured by DuPont), Flemion (registered trademark, manufactured by Asahi Glass Co. Ltd.), and Aciplex (registered trademark, manufactured by Asahi Kasei Corporation).

These perfluoro-type polymers are very expensive and have the problem of large gas crossover. Also, from the viewpoint of mechanical strength, physical durability, chemical stability and the like, the ionic group-containing polymer electrolyte (B) is preferably a hydrocarbon based polymer, and more preferably an aromatic hydrocarbon based polymer having an aromatic ring in the main chain. Particularly preferred are polymers having high mechanical strength and physical durability required when used as engineering plastics. The aromatic ring may contain not only a hydrocarbon based aromatic ring, but also a heterocycle or the like. Furthermore, together with the aromatic ring unit, an aliphatic unit may be contained in the polymer as part thereof.

The aromatic hydrocarbon based polymer is a polymer having a hydrocarbon backbone with an aromatic ring in the main chain, and its examples include polymers in which the main chain contains, together with an aromatic ring, a structure selected from the following: polysulfone, polyethersulfone, polyphenylene oxide, polyarylene ether based polymers, polyphenylene sulfide, polyphenylene sulfide sulfone, polyparaphenylene, polyarylene based polymers, polyarylene ketone, polyether ketone, polyarylenephosphine oxide, polyether phosphine oxide, polybenzoxazole, polybenzothiazole, polybenzimidazole, polyamide, polyimide, polyether imide, and polyimide sulfone. The terms "polysulfone," "polyether sulfone," "polyether ketone" or the like, used herein collectively refer to structures having, in their molecular chains, a sulfone bond, ether bond, ketone bond or the like, which include polyether ketone ketone, polyether ether ketone, polyether ether ketone ketone, polyether ketone ether ketone ketone, and polyether ketone sulfone. Their hydrocarbon backbones may contain a plurality of these structures. Of these, a polymer having a polyether ketone backbone, especially a polyether ketone based polymer, is most preferred as the aromatic hydrocarbon based polymer.

It is also preferable that the polymer electrolyte material to be used preferably has a phase separated structure such as co-continuous or lamellar structure. Such phase separated structures can be developed in, for example, a molded blend composed of two or more incompatible substances such as a hydrophilic compound having an ionic group and a hydrophobic compound having no ionic group or a block copolymer composed of two or more segments such as a segment (B1) containing an ionic group and a segment (B2) containing no ionic group, and their structural features can be roughly divided into the following four types: co-continuous (M1), lamellar (M2), cylindrical (M3), and sea-island (M4) (see FIG. 1). The ionic group-containing polymer electrolyte (B) used in the composite polymer electrolyte membrane is preferably a block copolymer containing one or more ionic group-containing segments (B1) and ionic group-free segments (B2).

In most polymer electrolyte membranes incorporating an ionic group-containing polymer electrolyte (B), the phase separated structure mentioned above is composed mainly of hydrophilic domains containing an ionic group-containing segment (B1) and a hydrophobic domains containing an ionic group-free segment (B2). In FIG. 1 (M1) to (M4), the continuous phase of a light color contains a domain selected from the hydrophilic domain and the hydrophobic domain, and the continuous phase or dispersed phase of a dark color contains the other type of domains. In particular, in a phase separated structure of the co-continuous (M1) or the lamellar (M2) type, the hydrophilic domain and the hydrophobic domain each form a continuous phase.

Such phase separated structures are described in, for example, Annual Review of Physical Chemistry, 41, 1990, p. 525. Controlling the structures and compositions of the compounds that constitute the hydrophilic domain and those that constitute the hydrophobic domain realizes an excellent proton conductivity even under low-humidity, low-temperature conditions and in particular, if the structures have the features of (M1) or (M2) shown in FIG. 1, that is, of the co-continuous type (M1) or the lamellar type (M2), continuous proton-conducting channels will be formed, making it possible to obtain polymer electrolyte moldings with excellent proton conductivity. At the same time, the crystallinity of the hydrophobic domain serves to realize a polymer electrolyte membrane having excellent fuel blocking capability, solvent resistance, mechanical strength, and physical durability. Among others, the adoption of a phase separated structure of the co-continuous type (M1) is particularly preferable.

We believe, on the other hand, that continuous proton-conducting channels can also be formed in a phase separated structure of (M3) or (M4) shown in FIG. 1, that is, of the cylindrical type (M3) or the sea-island type (M4). However, both structures tend to be formed when the ratio of the components that constitute the hydrophilic domain is relatively small compared to the components that constitute the hydrophobic domain or where the ratio of the components that constitute the hydrophobic domain is relatively small compared to the components that constitute the hydrophilic domain. In the former case, the quantity of ionic groups that support the proton conduction decreases absolutely and, in particular, no continuous proton-conducting channels are formed in sea-island structures, leading to low proton conductivity. In the latter case, on the other hand, although a high proton conductivity is ensured, the volume of crystalline hydrophobic domains will be small, and it will be impossible to achieve required levels of fuel blocking capability, solvent resistance, mechanical strength, physical durability, leading to a failure in sufficiently realizing the advantageous effect.

The term "domain" means a mass formed by aggregation of similar substances or segments in a molded body.

The term "aromatic hydrocarbon based polymer" collectively refers to such polymers including mixtures of a plurality of these polymers. In particular, polymer blends of ionic group-containing aromatic hydrocarbon based polymers and ionic group-free aromatic hydrocarbon based polymers can work effectively as polymer materials to form co-continuous type phase separated structures.

For example, the ionic group-containing polymer electrolyte (B) may be an ionic group-containing aromatic hydrocarbon based block copolymer (hereinafter occasionally referred to simply as block copolymer). Ionic group-containing aromatic hydrocarbon based block copolymers can serve particularly effectively as the aromatic hydrocarbon based polymer. An ionic group-containing aromatic hydrocarbon based block copolymer is a block copolymer composed mainly of an ionic group-containing aromatic hydrocarbon segments (B1) and ionic group-free aromatic hydrocarbon segments (B2). A segment as referred to herein is a partial structure of a copolymer chain that contains repeating units having specific features, and it has a molecular weight of 2,000 or more. Compared to polymer blends, the use of block copolymers develops co-continuous type phase separated structures having fine domains, allowing a higher power generation performance and physical durability to be achieved.

Hereinafter, an ionic group-containing aromatic hydrocarbon segment (B1) or polymer and an ionic group-free aromatic hydrocarbon segment (B2) or polymer will be occasionally referred to as ionic block and nonionic block, respectively. However, that the expression "ionic group-free" used herein is not intended to exclude when such a segment or polymer contains a small quantity of ionic groups unless they impede the formation of a co-continuous type phase separated structure.

It is preferable for the polymer electrolyte material to have a co-continuous type phase separated structure. More specifically, ionic blocks and nonionic blocks in the aromatic hydrocarbon based polymer are preferably combined together to form a co-continuous type phase separated structure. The existence of ionic block-containing domains in the co-continuous type phase separated structure allows good proton-conducting channels to be formed without performing the doping of an acidic substance and at the same time, the nonionic block-containing domains work to develop a high mechanical strength and fuel blocking capability.

A polymeric phase separated structure generally develops in a polymer in which two or more types of segments that are incompatible with each other are bonded such as block copolymer and graft copolymer, or in a polymer blend in which two or more types of polymers that are incompatible with each other are mixed. It is preferable to use a polymer electrolyte material that can develop a co-continuous type phase separated structure to allow proton conduction paths to be formed in an appropriate manner without performing the doping of an acidic substance. In diblock polymers containing two different types of blocks connected alternatingly, we found that cylindrical or sea-island type phase separated structures can be formed when the ratio of ionic blocks is relatively small compared to nonionic blocks or when the ratio of ionic blocks is relatively large to nonionic blocks. In the former case, the quantity of ionic groups, which support the proton conduction, will decrease to cause a decrease in proton conductivity, whereas in the latter case, the quantity of ionic groups increases to cause a decrease in mechanical strength. In a lamellar phase separated structure, a continuous lamellar structure will be formed in the direction vertical to the membrane surface to enable formation of good proton conduction paths. When combined with a nanofiber nonwoven fabric to form a composite, however, the fibers contained in the nanofiber nonwoven fabric will impede the formation of a continuous lamellar structure, making it impossible to realize a desired effect.

The existence of a co-continuous type phase separated structure in a polymer electrolyte material can be confirmed by examining whether the polymer electrolyte material meet requirements (1) and (2) below.

(1) The Average Interdomain Distance in the Phase Separated Structure is 2 nm or More.

The average interdomain distance can be determined by measuring the distances between domains in a processed image taken by transmission electron microscopy (TEM) and averaging the measurements. The finding that the average interdomain distance in the phase separated structure is 2 nm or more first confirms formation of a phase separated structure. The average interdomain distance is preferably 2 nm or more and less than 1 m, more preferably 5 nm or more and 500 nm or less, and still more preferably 10 nm or more and 100 nm or less. If the average interdomain distance is less than 2 nm, it will probably be impossible to observe a phase separated structure clearly, possibly showing that good proton-conducting channels have not been formed. If the average interdomain distance is 1 m or more, on the other hand, swelling can occur to cause deterioration in mechanical strength or physical durability although proton-conducting channels can be formed. As described previously, it is preferable for the average interdomain distance to be smaller than the pore size in the polyazole based nonwoven fabric. The average interdomain distance is determined according to the method described in item (4) in the EXAMPLES.

(2) A Co-Continuous Type Phase Separated Structure is Found by Transmission Electron Microscopy (TEM)

To examine the development of a co-continuous type phase separated structure, a three-dimensional diagram obtained by TEM tomography observation is compared to the patterns seen in three digital slice views cut out in the three directions of length, breadth, and height. In a specimen having a co-continuous type phase separated structure or a lamellar type phase separated structure, both ionic group-containing domains that incorporate ionic blocks (hereinafter referred to as ionic domains) and ionic group-free domains that incorporate nonionic blocks (hereinafter referred to as nonionic domains) form continuous phases in all three views and in particular, a specimen having a co-continuous type phase separated structure shows a pattern containing intricate continuous phases. In a lamellar type one, on the other hand, continuous layers show a pattern of connected layers. In a cylindrical structure and a sea-island structure, the domains of any one of the types do not form a continuous phase in at least one of the views. A continuous phase is one in which individual domains are connected instead of being isolated when viewed macroscopically.

When performing TEM observation or TEM tomography, the electrolyte membrane sample to be examined is preferably immersed in a 2 wt % aqueous lead acetate solution for 2 days for ion exchange of the ionic group for lead so that the difference in coagulation state and contrast between the ionic domains and nonionic domains can be clearly observed.

In the aromatic hydrocarbon based polymer in the ionic group-containing polymer electrolyte (B), the volume ratio between the ionic domains and the nonionic domains is preferably 80/20 to 20/80, and more preferably 60/40 to 40/60. If it is out of the range, the proton conductivity may not be sufficiently high or the dimensional stability and the mechanical characteristics may be below the required levels.

For aromatic hydrocarbon based polymers, the molar content ratio (A1/A2) of the ionic blocks to the nonionic blocks is preferably 0.20 or more, more preferably 0.33 or more, and still more preferably 0.50 or more. On the other hand, the molar content ratio (A1/A2) is preferably 5.00 or less, more preferably 3.00 or less, and still more preferably 2.50 or less. When the molar content ratio (A1/A2) is less than 0.20 or more than 5.00, the proton conductivity under low-humidity conditions may not be sufficiently high, and the hot water resistance and the physical durability may not be sufficiently high either. The molar content ratio A1/A2 is the ratio of the number of moles of the repeating units existing in the ionic blocks to the number of moles of the repeating units existing in the nonionic blocks. The number of moles of the repeating units is calculated by dividing the number average molecular weight of the ionic blocks or nonionic blocks by the molecular weight of the corresponding constituent units.

To ensure adequately high levels of dimensional stability, mechanical strength, physical durability, fuel blocking capability, and solvent resistance, it is preferable for the aromatic hydrocarbon based polymer to be a crystallizable polymer. A crystallizable polymer as referred to here has the capability to crystallize and will crystallize when heated, or it has already been crystallized.

Whether or not a polymer has crystalizability can be determined by differential scanning calorimetry (DSC) or wide angle X-ray diffraction. The heat of crystallization is preferably 0.1 J/g or more as determined by differential scanning calorimetry performed after the film production process, or the degree of crystallinity is preferably 0.5% or more as determined by wide angle X-ray diffraction. More specifically, if no crystallization peak is detected by differential scanning calorimetry, it means that the polymer is already crystallized or the polymer electrolyte is amorphous. If already crystallized, it should preferably show a degree of crystallinity of 0.5% or more when examined by wide angle X-ray diffraction.

Some crystallizable aromatic hydrocarbon based polymers are low in processability when processed into polymer electrolyte membranes. In such cases, protecting groups may be introduced into the aromatic hydrocarbon based polymers for temporary control of the crystallizability. More specifically, a crystallizable aromatic hydrocarbon based polymer containing a protecting group is combined with a polyazole based nanofiber nonwoven fabric to form a composite, followed by removing the protecting group. This allows the polymer to work as polymer electrolyte material.

There are no specific limitations on the ionic group to be incorporated in the aromatic hydrocarbon based polymer as long as it has proton-exchange capability. Preferable examples of such a functional group include sulfonic acid group, sulfonimide group, sulfuric acid group, phosphonic acid group, phosphoric acid group, and carboxylic acid group. Two or more ionic groups may be incorporated in a polymer. In particular, it is more preferable for the polymer to contain at least one selected from a sulfonic acid group, sulfonimide group, and sulfuric acid group from the viewpoint of their high proton conductivity, and it is most preferable to contain a sulfonic acid group from the viewpoint of input material cost.

The overall ion exchange capacity (IEC) of the aromatic hydrocarbon based polymer is preferably 0.1 meq/g or more and 5.0 meq/g or less from the viewpoint of the balance between proton conductivity and water resistance. The IEC is more preferably 1.4 meq/g or more and still more preferably 2.0 meq/g or more. On the other hand, the IEC is more preferably 3.5 meq/g or less and still more preferably 3.0 meq/g or less. When the IEC is less than 0.1 meq/g, the proton conductivity will not be sufficiently high in some cases, whereas when it is more than 5.0 meq/g, the water resistance will not be sufficiently high in some cases.

The IEC of the ionic blocks should be as high as possible from the viewpoint of the proton conductivity under low-humidify conditions and more specifically, it is preferably 2.5 meq/g or more, more preferably 3.0 meq/g or more, and still more preferably 3.5 meq/g or more. Regarding the upper limit, it is preferably 6.5 meq/g or less, more preferably 5.0 meq/g or less, and still more preferably 4.5 meq/g or less. The proton conductivity under low-humidify conditions will not be sufficiently high if the IEC of the ionic blocks is less than 2.5 meq/g while the hot water resistance and physical durability will not be sufficiently high if it is more than 6.5 meq/g.

The IEC of the nonionic blocks is preferably small from the viewpoint of the hot water resistance, mechanical strength, dimensional stability, and physical durability and more specifically, it is preferably 1.0 meq/g or less, more preferably 0.5 meq/g or less, and still more preferably 0.1 meq/g or less. If the IEC of the nonionic blocks is more than 1.0 meq/g, its hot water resistance, mechanical strength, dimensional stability, and physical durability will not be sufficiently high in some cases.

The IEC is the molar quantity of ionic groups introduced per unit dry weight of the aromatic hydrocarbon based polymer, and a larger IEC value means a larger quantity of ionic groups introduced. The IEC should be determined by the neutralization titration method. The determination of the IEC by neutralization titration is performed according to the method described in item (2) in the EXAMPLES.

It is preferable to use an aromatic hydrocarbon based block copolymer as the aromatic hydrocarbon based polymer to be incorporated in the ionic group-containing polymer electrolyte (B), and it is more preferable to use a polyether ketone based block copolymer. It is most preferable to use a polyether ketone based block copolymer that incorporates segments including ionic group-containing constituent unit (S1) and segments including an ionic group-free constituent unit (S2) as shown below:

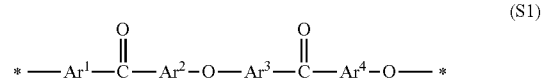

(S1)

In formula (S1), $Ar^1$ to $Ar^4$ each denote an appropriate divalent arylene group, $Ar^1$ and/or $Ar^2$ containing an ionic group, and $Ar^3$ and $Ar^4$ each containing or not containing an ionic group. $Ar^1$ to $Ar^4$ may be substituted appropriately and may independently be one selected from two or more arylene groups. The symbol * signifies a bond moiety with a constituent unit as represented by formula (S1) or with other constituent units.

(S2)

In formula (S2), $Ar^5$ to $Ar^8$ each represent an appropriate divalent arylene group, may be appropriately substituted, and have no ionic group. $Ar^5$ to $Ar^8$ may independently be one selected from two or more arylene groups. The symbol * signifies a bond moiety with a constituent unit as represented by formula (S2) or with other constituent unit.

Preferred divalent arylene groups for use as $Ar^1$ to $Ar^8$ include, but not limited to, hydrocarbon based arylene groups such as phenylene group, naphthylene group, biphenylene group, and fluorenediyl group, and heteroarylene groups such as pyridinediyl, quinoxalinediyl, and thiophenediyl. $Ar^1$ to $Ar^8$ is each preferably a phenylene group or a phenylene group containing an ionic group, and most preferably a p-phenylene group or a p-phenylene group containing an ionic group. Furthermore, $Ar^5$ to $Ar^8$ may be substituted by a group other than an ionic group, but they are preferably non-substituted from the viewpoint of proton conductivity, chemical stability, and physical durability.

Composite Polymer Electrolyte Membrane

The composite polymer electrolyte membrane has a composite layer containing the ionic group-containing polymer electrolyte (B) (polymer electrolyte material) and the polyazole based nanofiber nonwoven fabric (A) combined into a composite. In the composite formation step, pores (void space) in the polyazole based nanofiber nonwoven fabric are filled with the polymer electrolyte material. In the composite layer, the rate of filling with the polymer electrolyte material is preferably 50% or more and more preferably 60% or more. As the filling rate in the composite layer decreases, proton conduction paths are lost and the power generation performance decreases. The filling rate of the composite layer is calculated from the IEC and more specifically, it is determined according to the method described in item (3) in the EXAMPLES.

The composite polymer electrolyte membrane may contain only one such composite layer or may contain a stack of two or more composite layers. When forming such a stack, the plurality of composite layers contained may have different filling rates. Furthermore, the composite polymer electrolyte membrane may contain a layer made only of a polymer electrolyte material in contact with each or either surface of a composite layer. The existence of such a layer works to improve the adhesion between the composite polymer electrolyte membrane and the electrode, serving to prevent boundary separation. When forming such a layer made only of a polymer electrolyte material in contact with each or either surface of a composite layer, the electrolyte material contained in that layer is preferably an aromatic hydrocarbon based polymer, and it is more preferably the same polymer as the aromatic hydrocarbon based polymer used to fill the composite layer.

The existence of a composite layer in the composite polymer electrolyte membrane works to decrease the dimensional change rate in the plane direction. When the electrolyte membrane is used in a fuel cell, a decrease in the dimensional change rate in the plane direction acts to reduce the stress caused by swelling and shrinkage in the edge portions of the electrolyte membrane in repeated dry-wet cycles, thus improving durability. The dimensional change rate $\lambda_{xy}$ in the plane direction of the composite polymer electrolyte membrane is preferably 10% or less, more preferably 8% or less, and still more preferably 5% or less.

Furthermore, the anisotropy in dimensional change rate is preferably small between the MD and the TD in the plane of the composite polymer electrolyte membrane. A large anisotropy can restrict the cell design of a fuel cell or lead to the concentration of stress caused by swelling and shrinkage along the edges that are perpendicular to the large dimensional change direction, possibly resulting in a rupture of the electrolyte membrane starting from the edges. More specifically, the ratio $\lambda_{MD}/\lambda_{TD}$ preferably meets the relation $0.5<\lambda_{MD}/\lambda_{TD}<2.0$ where $\lambda_{MD}$ is the dimensional change rate in the MD direction and $\lambda_{TD}$ is the dimensional change rate in the TD direction in the plane of the composite polymer electrolyte membrane.

The dimensional change rate is an indicator of the dimensional change between the composite polymer electrolyte membrane in a dry state and the composite electrolyte membrane in a wet state and specifically, it is determined by the method described in item (5) in the EXAMPLES.

For the same reasons, furthermore, the anisotropy between the MD and TD directions is also preferably small in terms of the elastic modulus and yield stress of the composite electrolyte membrane.

There are no specific limitations on the thickness of the composite layer in the composite electrolyte membrane, but it is preferably 0.5 μm or more and 50 μm or less, and more preferably 2 μm or more and 40 μm or less. A thick composite layer can work to improve the physical durability of the electrolyte membrane, but tends to increase the membrane resistance. A thin composite layer, on the other hand, can work to improve the power generation performance, but tends to cause problems in physical durability, often leading to such problems as short-circuiting or fuel permeation.

Production Method for Composite Polymer Electrolyte Membrane

The composite polymer electrolyte membrane can be produced by, for example, a production method for composite polymer electrolyte membranes including a step where an aromatic hydrocarbon based polymer forming a co-continuous type phase separated structure is used as the ionic group-containing polymer electrolyte (B) (polymer electrolyte material), and a composite of the basic polyazole based nanofiber nonwoven fabric (A) and the polymer electrolyte material is produced under conditions where the ionic groups in the polymer electrolyte material form a salt with the cations in the alkali metals or alkaline earth metals, and a step where the cations in the alkali metals or alkaline earth metals forming a salt with the ionic groups are exchanged for protons, the steps being carried out in this order. The production method is described below. Such a polymer electrolyte material whose ionic groups form a salt with the cations in the alkali metals or alkaline earth metals will be referred to hereinafter as a salt type polymer electrolyte material.

A preferred method to combine a basic polyazole based nanofiber nonwoven fabric and a salt type polymer electrolyte material to form a composite is to impregnate a polyazole based nanofiber nonwoven fabric with a solution of a salt type polymer electrolyte material (hereinafter referred to occasionally as polymer electrolyte solution), followed by drying the solvent to provide a composite polymer electrolyte membrane. Good methods of impregnating a nanofiber nonwoven fabric with a solution of a salt type polymer electrolyte material include (1) a method in which a nanofiber nonwoven fabric immersed in a salt type polymer electrolyte solution is pulled out while removing the excess solution to control the membrane thickness, (2) a method in which a nanofiber nonwoven fabric is coated with a salt type polymer electrolyte solution by flow-casting, and (3) a method in which a support base is coated with a salt type polymer electrolyte solution by flow-casting, followed by putting a nanofiber nonwoven fabric thereon to realize impregnation.

When impregnation is performed by the method of (3), a solvent drying step can be performed simply thereafter. When impregnation is performed by the method of (1) or (2), a step of drying the solvent from the polymer electrolyte material is preferably performed after putting the nanofiber nonwoven fabric on a support base prepared elsewhere, which reduces the wrinkles and uneven thickness distribution in the composite polymer electrolyte membrane to ensure improved membrane quality. The drying time and drying temperature can be set appropriately based on experimental data, but the drying is preferably continued at least to such a degree that the membrane can stand by itself after removing the base. The drying step can be performed by a generally known method such as heating of the base, applying of hot air, and use of an infrared heater. The drying temperature is preferably 200° C. or less, and more preferably 130° C. or less, in view of the decomposition of the polymer electrolyte.

To prepare a salt type polymer electrolyte solution, a suitable solvent may be selected appropriately depending on the polymer used. Preferred solvents include non-protonic polar solvents such as N,N-dimethylacetamide, N,N-dimethylformamide, N-methyl-2-pyrrolidone, dimethylsulfoxide, sulfolane, 1,3-dimethyl-2-imidazolidinone and hexamethylphosphone triamide; ester based solvents such as γ-butyrolactone, ethyl acetate, and butyl acetate; carbonate based solvents such as ethylene carbonate and propylene carbonate; and alkylene glycol monoalkyl ethers such as ethylene glycol monomethyl ether, ethylene glycol monoethyl ether, propylene glycol monomethyl ether, and propylene glycol monoethyl ether. It is also good to use a mixed solvent prepared by combining two or more of these solvents.

For viscosity adjustment, the solvent to be used may also contain an alcohol based solvent such as methanol, ethanol, 1-propanol, and isopropyl alcohol; a ketone based solvent such as acetone, methyl ethyl ketone, and methyl isobutyl ketone; an ester based solvent such as ethyl acetate, butyl acetate, and ethyl lactate; a hydrocarbon based solvent such as hexane and cyclohexane; an aromatic hydrocarbon based solvent such as benzene, toluene, and xylene; a halogenated hydrocarbon based solvent such as chloroform, dichloromethane, 1,2-dichloroethane, perchloroethylene, chlorobenzene, dichlorobenzene, and hexafluoroisopropyl alcohol; an ether based solvent such as diethyl ether, tetrahydrofuran, and 1,4-dioxane; a nitrile based solvent such as acetonitrile; a nitrated hydrocarbon based solvent such as nitromethane and nitroethane; or a low boiling point solvent such as water and various others.

The salt type polymer electrolyte solution to be used preferably has a concentration of 5 to 40 wt %, more preferably 10 to 25 wt %. If the concentration is in this range, the polymer can sufficiently fill the pores (void space) in the nanofiber nonwoven fabric, and a composite layer with high surface smoothness can be obtained. If the concentration of the salt type polymer electrolyte solution is too low, the efficiency in filling the pores (void space) in the nanofiber nonwoven fabric with the polymer electrolyte material will decrease, possibly requiring a plurality of times of repeated immersion treatment. If the concentration of the salt type polymer electrolyte solution is too high, on the other hand, the viscosity of the solution will be so high that the polymer will fail to sufficiently fill the pores (void space) in the nanofiber nonwoven fabric, possibly leading to a decrease in the filling rate in the composite layer or a deterioration in the surface smoothness of the resulting composite electrolyte membrane.

The solution viscosity of the salt type polymer electrolyte solution is preferably 100 to 50,000 mPa·s, and more preferably 500 to 10,000 mPa·s. If the solution viscosity is too low, the solution will not be retained sufficiently and possibly flow out of the nanofiber nonwoven fabric. If it is too high, on the other hand, the same problems as described above can also occur.

Production of a composite by combining a polymer electrolyte material and a nano-fiber nonwoven fabric is preferably performed with the nanofiber nonwoven fabric fixed on a support base. There are no specific limitations on the support base to be used and a generally known one may be adopted such as an endless belt or drum of stainless steel or other metals, a film of polyethylene terephthalate, polyimide, polyphenylene sulfide, polysulfone, or other polymers, a glass plate, and release paper. If a metal or a polymer film is used, the surface of the former is preferably subjected to mirror surface treatment and the coat surface of the latter is preferably subjected to corona treatment or peelability improving treatment. If a roll is produced while performing continuous coating, the back of the coated surface may be subjected to peelability improving treatment to prevent the adhesion between the electrolyte membrane and the back of the coated base after winding up. When a film is used, there are no specific limitations on its thickness, but it is preferably 50 m to 600 m from the viewpoint of handleability.

Good methods of flow-casting a salt type polymer electrolyte solution include knife coating, direct roll coating, Meyer bar coating, gravure coating, reverse coating, air knife coating, spray coating, brush coating, dip coating, die coating, vacuum die coating, curtain coating, flow coating, spin coating, screen printing, and ink jet coating.

During the step of impregnation with the salt type polymer electrolyte solution, it may also be effective to reduce or increase the pressure, heat the polymer electrolyte solution, or increase the temperature of the base material or impregnation atmosphere to enhance the impregnation efficiency.

Our production method includes a step where a composite of a salt type polymer electrolyte material and a basic polyazole based nanofiber nonwoven fabric is produced is followed by a step where the cations in the alkali metal or alkaline earth metal forming a salt with ionic groups are exchanged for protons.

The latter step is preferably carried out by bringing a composite layer of the nanofiber nonwoven fabric and the salt type polymer electrolyte material into contact with an acidic aqueous solution. It is preferable for this contact to be realized by the step of immersing the composite layer in the acidic aqueous solution. In this step, protons in the acidic aqueous solution are replaced with cations ionically bonded with the ionic groups and, at the same time, residual components such as water-soluble impurities, remaining monomers, solvents, and salts are removed.

There are no specific limitations on the acidic aqueous solution to be used, but preferred substances include sulfuric acid, hydrochloric acid, nitric acid, acetic acid, trifluoromethane sulfonic acid, methane sulfonic acid, phosphoric acid, and citric acid. The temperature and concentration of the acidic aqueous solution should also be set appropriately, but from the viewpoint of productivity, it is preferable to use a 3 wt % or more and 30 wt % or less aqueous sulfuric acid solution at a temperature of 0° C. or more and 80° C. or less.

When a composite layer with a thickness of 30 µm or less is used when producing a composite having a support base, it is preferable to bring the support base into contact with an acidic aqueous solution without removing the composite layer therefrom. If a support base is not used, the electrolyte membrane will be so thin that the mechanical strength can decrease and breakage of the membrane can occur when it comes in contact with water and/or an acidic solution, causing its swelling. Eventually, furthermore, wrinkles can occur in the composite layer during its drying, leading to surface defects.

The composite layer can contain additives such as cross-linking agent, crystallization nucleating agent commonly used for polymer compounds, plasticizer, stabilizer, mold releasing agent, antioxidant, radical scavenger, and inorganic fine particles, with the aim of mechanical strength improvement, ionic group's heat stability improvement, water resistance improvement, solvent resistance improvement, radical resistance improvement, coating liquid's coatability improvement, and storage stability improvement, unless they impair the desired effect.

The composite polymer electrolyte membrane is applicable to various uses. For example, it can be applied to medical uses such as artificial skin, filtering related uses, ion-exchange resin related uses such as chlorine resistant reverse osmosis membrane, various structural materials, electrochemical uses, humidification membrane, antifogging membrane, antistatic membrane, deoxidizing membrane, solar cell membrane, and gas barrier material. In particular, they serve favorably for various electrochemical uses. Such electrochemical uses include, for example, solid polymer electrolyte fuel cell, redox flow battery, water electrolysis equipment, chloroalkali electrolysis equipment, electrochemical type hydrogen pump, and water electrolysis type hydrogen generation equipment.

In a solid polymer electrolyte fuel cell, electrochemical type hydrogen pump, or water electrolysis type hydrogen generation equipment, a polymer electrolyte membrane has, on each side, a catalyst layer, an electrode base, and a separator stacked in this order. In particular, an electrolyte membrane having a catalyst layer on each side (i.e., a layer structure of catalyst layer/electrolyte membrane/catalyst layer) is called catalyst coated membrane (CCM), and an electrolyte membrane having a catalyst layer and a gas diffusion base stacked on each side (i.e., a layer structure of gas diffusion base/catalyst layer/electrolyte membrane/catalyst layer/gas diffusion base) is called membrane electrode assembly (MEA). The composite polymer electrolyte membrane can be used suitably as an electrolyte membrane to form such a CCM or MEA.

EXAMPLES

Our membranes, assemblies and fuel cells will be described in more detail referring to examples, but this disclosure is not limited to these examples. The various measurements were taken under the conditions described below.

(1) Molecular Weight of Polymer

The number average molecular weight and the weight average molecular weight of a polymer solution were measured by GPC. As the, HLC-8022GPC manufactured by TOSOH Corporation was used as an integrated analyzer that combines an ultraviolet ray detector and a differential refractometer and two of TSK gel Super HM-H (6.0 mm inside diameter, 15 cm length) manufactured by TOSOH Corporation were used as GPC columns to take measurements with an N-methyl-2-pyrrolidone solvent (an N-methyl-2-pyrrolidone solvent containing 10 mmol/L of lithium bromide), at a flow rate of 0.2 mL/min, followed by determining the number average molecular weight and the weight average molecular weight based on a standard polystyrene.

(2) Ion Exchange Capacity (IEC)

Measurements were taken by neutralization titration. Three measurements were taken and their average was adopted.

1. A composite polymer electrolyte membrane was proton-substituted and fully rinsed with pure water, followed by wiping off water from its surface, vacuum drying at 100° C. for 12 hours or more, and determining the dry weight.

2. A 50 mL volume of a 5 wt % aqueous sodium sulfate solution was added to the composite polymer electrolyte membrane, which was then allowed to stand for 12 hours and subjected to ion-exchange.

3. The resulting sulfuric acid was titrated with a 0.01 mol/L aqueous sodium hydroxide solution. A commercially available 0.1 w/v % phenolphthalein solution for titration was added as indicator and titrated to reach an end point where the color turned light reddish purple.

4. The IEC was calculated by the equation given below:

$$IEC\ (meq/g) = [\text{concentration of aqueous sodium hydroxide solution (mmol/mL)} \times \text{dropped quantity (mL)}] / \text{dry weight of sample (g)}.$$

(3) Rate of filling with aromatic hydrocarbon based polymer electrolyte in composite layer A cross section of the composite polymer electrolyte membrane was observed by optical microscopy or scanning electron microscopy (SEM) to determine the thickness T1 of the composite layer composed of an aromatic hydrocarbon based polymer electrolyte and a polyazole based nanofiber nonwoven fabric. If there were other layers outside the composite layer, their thicknesses T2 and T3 were also determined. The specific gravity of the polymer electrolyte in the composite layer was denoted by D1, and the specific gravities of the polymer electrolytes in the other layers located outside the composite layer were denoted by D2 and D3, respectively. The specific gravity of the composite polymer electrolyte membrane was denoted by D. The content Y2 (vol %) of the aromatic hydrocarbon based polymer electrolyte in the composite layer was calculated by the equation given below, where the IEC of the polymer in each layer is denoted by I1, I2, and I3, while the IEC of the composite polymer electrolyte membrane is denoted by I:

$$Y2 = [(T1+T2+T3) \times D \times I - (T2 \times D2 \times I2 + T3 \times D3 \times I3)] / (T1 \times D1 \times I1) \times 100.$$

(4) Observation of Phase Separated Structure by Transmission Electron Microscopy (TEM) Tomography A specimen of the composite polymer electrolyte membrane was immersed in a 2 wt % aqueous lead acetate solution, used as dyeing agent, and left to stand at 25° C. for 48 hours to dye the specimen. The dyed specimen was taken out, embedded in epoxy resin, and exposed to visible light for 30 seconds for fixation. A 100 nm ultrathin section was prepared at room temperature using an ultramicrotome and observed under the conditions given below:

Equipment: field emission type electron microscope (HR-TEM), JEM2100F manufactured by JEOL Image acquisition: Digital Micrograph System: marker method Accelerating voltage: 200 kV Photograph magnification: ×30,000
Inclination angle: +61° to −620
Reconstruction resolution: 0.71 nm/pixel.

Three dimensional reconstruction was carried out by the marker method. In performing the three dimensional reconstruction, Au colloid particles put on a collodion membrane were used as marker for positioning. Using the marker as reference, TEM images were photographed while tilting the specimen by 1° at a time over the range from +61° to −620 to provide a continuous tilting image observation series, from which a total of 124 TEM images were obtained. Based on them, CT reconstruction was carried out to observe the three dimensional phase separated structure.

For image processing, Luzex (registered trademark) AP, manufactured by Nireco Corporation, was used to perform auto-mode TEM image processing for concentration irregularity correction, concentration conversion, and space filtering. A processed image was gradated by the equipment in the auto mode in 256 steps from black to white, and the steps from 0 to 128 and those from 129 to 256 were regarded as black and white, respectively, for color identification of the ionic block-containing domains and nonionic block-containing domains. Then, the interdomain distances between them were determined and their average was taken as average interdomain distance.

(5) Measurement of Dimensional Change Rate ($\lambda_{xy}$) by Hot Water Test

An approx. 5 cm×approx. 5 cm square was cut out of a composite polymer electrolyte membrane and left to stand for 24 hours in a temperature and humidity controlled atmosphere with a temperature of 23° C.±5° C. and a humidity of 50%±5%, followed by measuring the length in the MD direction and the length in the TD direction (MD1 and TD1, respectively) using a caliper. After immersing the electrolyte membrane in hot water at 80° C. for 8 hours, the length in the MD direction and the length in the TD direction (MD2 and TD2, respectively) were measured again using a caliper, followed by calculating the dimensional change rate in the MD direction and the TD direction ($\lambda_{MD}$ and $\lambda_{TM}$, respectively) in the plane and the planar dimensional change rate ($\lambda_{xy}$) (%) by the equations given below:

$$\lambda_{MD}=(MD2-MD1)/MD1\times100$$

$$\lambda_{TD}=(TD2-TD1)/TD1\times100$$

$$\lambda_{xy}=(\lambda_{MD}+\lambda_{TD})/2.$$

(6) Preparation of Membrane Electrode Assembly (MEA) Containing Composite Polymer Electrolyte Membrane A pair of 5 cm×5 cm squares were cut out of a ELAT (registered trademark) LT120ENSI commercially available gas diffusion electrode for fuel cells, manufactured by BASF GmbH with 5 g/m² Pt and used to sandwich a composite polymer electrolyte membrane in an opposing manner to work as fuel electrode and air electrode, followed by heat-pressing under 5 MPa at 150° C. for 3 minutes to provide a MEA for evaluation.

(7) Degree of Proton Conductivity

A membrane-shaped sample was immersed in pure water at 25° C. for 24 hours and held in a thermo-hygrostat at a temperature of 80° C. and a relative humidity of 25% to 95% for 30 minutes each in several steps, followed by determining the degree of proton conductivity by the constant-voltage AC impedance method. The measuring apparatus adopted was an electrochemical measurement system manufactured by Solartron Inc. (Solartron 1287 Electrochemical Interface and Solartron 1255B Frequency Response Analyzer), which was used to determine the degree of proton conductivity from constant-voltage impedance measurements taken by 2-probe analysis. The AC amplitude was 50 mV. The sample used was in the form of a membrane with a width of 10 mm and a length of 50 mm. The measurement jig was fabricated using a phenol resin, and the measurement portion was opened. The electrodes used were platinum plates (two plates each having a thickness of 100 μm). The electrodes were arranged so that they were 10 mm away from each other and located on the opposite surfaces of the sample membrane, parallel to each other, and perpendicular to the length direction of the sample membrane.

(8) Durability Against Dry-Wet Cycles

A MEA sample prepared as described in paragraph (6) was placed in a JARI Ex-1 standard cell (electrode area 25 cm²), manufactured by EIWA Corporation, and a cycle of supplying 160% RH nitrogen to both electrodes for 2 minutes and subsequently supplying 0% RH nitrogen (dew point −20° C. or below) to both electrodes for 2 minutes while maintaining the cell temperature at 80° C. was repeated. The quantity of permeated hydrogen was measured every 1,000 cycles and the point where the hydrogen permeation current exceeded 10 times the initial current was taken as indicator of the durability against dry-wet cycles.

Measurements of the quantity of permeated hydrogen were taken in a test where hydrogen was supplied as fuel gas to an electrode while nitrogen was supplied to the other electrode under the humidify conditions of hydrogen gas 90% RH and nitrogen gas 90% RH. This state was maintained until the open circuit voltage decreased to below 0.2 V, and then the voltage was swept from 0.2 to 0.7 V at a rate of 1 mV/sec, followed by determining the current at 0.7 V to represent the hydrogen permeation current.

(9) Observation of Nanofiber Nonwoven Fabric by Scanning Electron Microscopy (FE-SEM)

A nanofiber nonwoven fabric sample was coated with fine metal particles by sputter coating and observed under the conditions described below:
Equipment: field emission type scanning electron microscope (FE-SEM) SU8020, manufactured by Hitachi High-Technologies Corporation
Accelerating voltage: 2.0 kV For image processing, Luzex (registered trademark) AP, manufactured by Nireco Corporation, was used to perform auto-mode SEM image processing for concentration irregularity correction, concentration conversion, and space filtering. A processed image was subjected to a gradation process by the equipment in the auto mode in 256 steps from black to white, and the steps from 0 to 128 and those from 129 to 256 were regarded as black and white, respectively, for color identification of the portions that contained fibers of the nanofiber nonwoven fabric and the portions that did not contain them to determine the diameter of the fibers of the nanofiber nonwoven fabric. Then, the distances between fibers of the nanofiber nonwoven fabric were measured and the average of the measurements was taken as average interfiber distance. The average interfiber distance was regarded as representing the pore size.

(10) Analysis of Crystal Structure of Nanofiber Nonwoven Fabric by X-Ray Diffraction (XRD)

Pieces of a nonwoven fabric sample were stacked to a total thickness of 1 mm, fixed on a Si nonreflective plate, and observed by wide angle X-ray diffraction (2θ-θ scanning). The half-widths of peaks contained in the spectrum observed were calculated and compared. The measuring conditions were as described below:

wide angle X-ray diffraction (2θ-θ scanning)
(i) X-ray generator
RU-200R (rotating anticathode type), manufactured by Rigaku Corporation
X-ray source: CuKα ray (curved crystal monochromator)
Output: 50 kV, 200 mA
(ii) Goniometer
Model 2155S2, manufactured by Rigaku Corporation
Slit system: 1°-1°-0.3 mm-0.45 mm
Detector: scintillation counter
(iii) Counting/recording equipment
Model RINT-1400, manufactured by Rigaku Corporation
(iv) Scanning type
2θ-θ continuous scanning
(v) Measuring range (2θ)
3° to 60°
(vi) Measuring step (2θ)
0.02°
(vii) Scanning speed
1°/min.
(11) Absorption Spectrum Observation The diffuse reflectance spectrum of the nanofiber nonwoven fabric obtained under the measuring conditions given below were converted into the Kubelka-Munk function. The Kubelka-Munk function is given as $(1-R)^2/2R$ where R denotes the relative diffuse reflectance of the specimen. The Kubelka-Munk representation enables quantitative analysis in proportion to the absorption coefficient and specimen concentration as in the absorption spectrum analysis by the penetration method.
Measuring equipment: SolidSpec-3700DUV ultraviolet-visible-near infrared spectrophotometer (manufactured by Shimadzu Corporation)
Slit width: 8 mm (870 nm or less), 20 nm (870 nm or more)
Slit program: normal
Measuring speed: low speed
Light source: deuterium lamp (310 nm or less)
Halogen lamp (310 nm or more)
Detector: PMT (870 nm or less)
InGaAs (870 to 1,650 nm)
Attached devices: large-type specimen chamber, integrating sphere (60 mm diameter), Spectralon
Incidence angle reflection: 8°
Reference: standard white plate (manufactured by Labsphere)
(12) Observation of Emission Spectrum The emission spectrum of a nanofiber nonwoven fabric sample was observed under the measuring conditions given below, and the peak intensity (I300) under excitation at 300 nm and the peak intensity (I450) under excitation at 450 nm were compared. The emission intensity was normalized by the excitation light intensity at the relevant wavelength and corrected for dark counts. No special filters were used. Emission in the direction of 22.5° from the excitation light was observed.
Measuring equipment: Fluorolog 3-22 (manufactured by HORIBA Jobin Yvon)
Light source: xenon lamp
Detector: PMT
Excitation wavelength: 300 nm and 450 nm
Observation wavelength: up to 750 nm (in increments of 1 nm)
Slit width: excitation side 2 nm, observation side 2 nm
Time constant: 0.2 s
Measuring mode: SC/RC

(13) Measurement of Tg

The glass transition point (Tg) of a nanofiber nonwoven fabric material was measured by differential scanning calorimetry (DSC) under the measuring conditions given below:
Measuring equipment: DSC6220, manufactured by SII
Measuring range: 30° C. to 550° C.
Scanning speed: 2° C./min.

Synthesis Example 1

Synthesis of 2,2-bis(4-hydroxyphenyl)-1,3-dioxolane (K-DHBP) Represented by Formula (G1)

In a 500 ml flask equipped with a stirrer, thermometer, and distillation tube, 49.5 g of 4,4'-dihydroxy benzophenone, 134 g of ethylene glycol, 96.9 g of trimethyl orthoformate, and 0.50 g of p-toluene sulfonic acid monohydrate were fed and dissolved. The solution was stirred for 2 hours while being warmed at 78° C. to 82° C. Furthermore, the internal temperature was gradually increased to 120° C., and heating continued until the distilling of methyl formate, methanol, and trimethyl orthoformate completely stopped. After cooling of the reaction solution to room temperature, the reaction solution was diluted with ethyl acetate, and then the organic layer washed with 100 ml of a 5% aqueous solution of potassium carbonate, followed by separating the liquid and distilling the solvent. Then, 80 ml of dichloromethane was added to the residue to precipitate a crystalline material, followed by filtering and drying to provide 52.0 g of 2,2-bis(4-hydroxyphenyl)-1,3-dioxolane. GC analysis of the crystal showed 99.9% of 2,2-bis(4-hydroxyphenyl)-1,3-dioxolane and 0.1% of 4,4'-dihydroxybenzophenone.

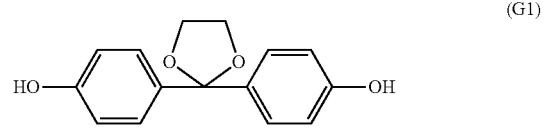 [SMILES: Oc1ccc(C2(c3ccc(O)cc3)OCCO2)cc1]

(G1)

Synthesis Example 2

Synthesis of disodium-3,3'-disulfonate-4,4'-difluorobenzophenone Represented by Formula (G2)

First, 109.1 g of 4,4'-difluorobenzophenone (Aldrich reagent) was reacted in 150 mL of fuming sulfuric acid (50% $SO_3$) (reagent, manufactured by Wako Pure Chemical Industries, Ltd.) at 100° C. for 10 hours. Then, the solution was gradually poured into a large volume of water, and after neutralizing it with NaOH, 200 g of sodium chloride was added to precipitate the synthesis product. The resulting precipitate was separated by filtration, followed by recrystallization in an aqueous ethanol solution to provide disodium-3,3'-disulfonate-4,4'-difluorobenzophenone, which is represented by formula (G2). Its purity was 99.3%.

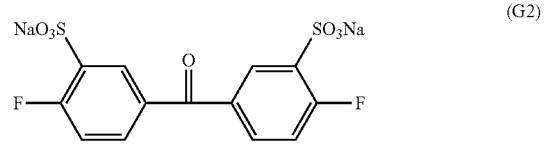

(G2)

Synthesis Example 3

Synthesis of Ionic Group-Free Oligomer a1, which is Represented by Formula (G3)

To a 1,000 mL three neck flask equipped with a stirrer, a nitrogen supply tube, and a Dean-Stark trap, 16.59 g of potassium carbonate (Aldrich reagent, 120 mmol), 25.8 g of K-DHBP (100 mmol) prepared in Synthesis Example 1 given above, and 20.3 g of 4,4'-difluorobenzophenone (Aldrich reagent, 93 mmol) were fed, followed by nitrogen purging, dehydration in 300 mL of N-methylpyrrolidone (NMP) and 100 mL of toluene at 160° C., heating to remove toluene, and polymerization at 180° C. for 1 hour. The material was purified by reprecipitation with a large amount of methanol to provide an ionic group-free oligomer a1 (with hydroxyl end group). Its number average molecular weight was 10,000.

To a 500 mL three neck flask equipped with a stirrer, nitrogen supply tube, and Dean-Stark trap, 1.1 g of potassium carbonate (Aldrich reagent, 8 mmol) and 20.0 g (2 mmol) of the ionic group-free oligomer a1 (with hydroxyl end group) were fed, followed by nitrogen purging, dehydration in 100 mL of N-methyl pyrolidone (NMP) and 30 mL of toluene at 100° C., heating to remove toluene, addition of 4.0 g of decafluorobiphenyl (Aldrich reagent, 12 mmol), and reaction at 105° C. for 1 hour. The material was purified by reprecipitation with a large amount of isopropyl alcohol to provide an ionic group-free oligomer a1 (with fluoro end group) as represented by formula (G3) below. Its number average molecular weight was 11,000.

Synthesis Example 4

Synthesis of Ionic Group-Containing Oligomer a2, which is Represented by Formula (G4)

To a 1000 mL three neck flask equipped with a stirrer, nitrogen supply tube, and Dean-Stark trap, 27.6 g of potassium carbonate (Aldrich reagent, 200 mmol), 12.9 g (50 mmol) of K-DHBP prepared in Synthesis Example 1 above, 9.3 g of 4,4'-biphenol (Aldrich reagent, 50 mmol), 39.3 g (93 mmol) of disodium-3,3'-disulfonate-4,4'-difluorobenzophenone prepared in Synthesis Example 2 above, and 17.9 g of 18-crown-6 (82 mmol, manufactured by Wako Pure Chemical Industries, Ltd.) were fed, followed by nitrogen purging, dehydration in 300 mL of N-methylpyrrolidone (NMP) and 100 mL of toluene at 170° C., heating to remove toluene, and polymerization at 180° C. for 1 hour. The material was purified by reprecipitation with a large amount of isopropyl alcohol to provide an ionic group-containing oligomer a2 (with hydroxyl end group) as represented by formula (G4) below. Its number average molecular weight was 16,000.

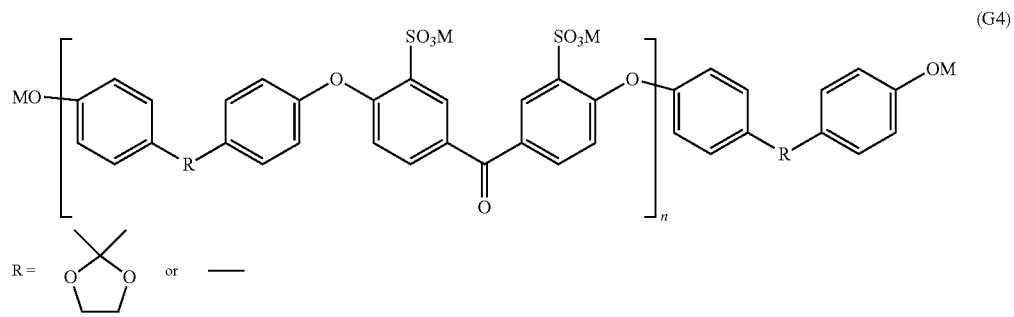

In formula (G4), M represents H, Na, or K.

Synthesis Example 5

Synthesis of Neopentyl 3-(2,5-dichlorobenzoyl)benzenesulfonate, which is Represented by Formula (G5)

To a 3 L three neck flask equipped with a stirrer and a cooling tube, 245 g (2.1 mol) of chlorosulfonic acid was fed and then 105 g (420 mmol) of 2,5-dichlorobenzophenone was fed, followed by their reaction in a 100° C. oil bath for 8 hours. After a predetermined time, the reaction solution was gradually poured into 1,000 g of crushed ice, followed by extraction with ethyl acetate. The organic layer was washed with a solution of sodium chloride, followed by drying with magnesium sulfate and distillation of ethyl acetate to provide a light yellow crude crystal of 3-(2,5-dichlorobenzoyl)benzenesulfonic acid chloride. In the next step, the crude crystal was used as obtained without purification.

First, 41.1 g (462 mmol) of 2,2-dimethyl-1-propanol (neopentyl alcohol) was added to 300 mL of pyridine and

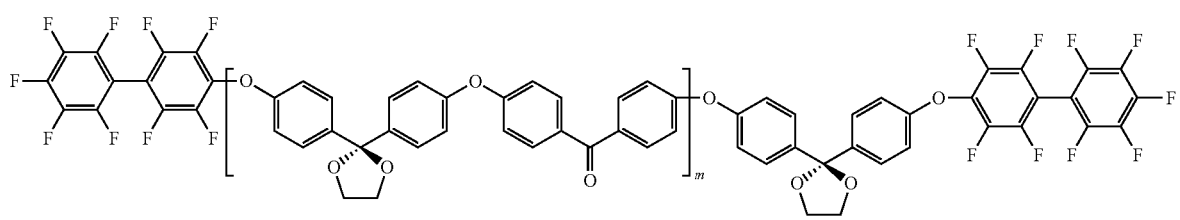

cooled to about 10° C. The crude crystal obtained above was gradually added over about 30 minutes. After the addition of the entire quantity, additional stirring was performed for 30 minutes for reaction. After the reaction, the reaction solution was poured into 1,000 mL of an aqueous hydrochloric acid solution, and the resulting solid precipitate collected. The resulting solid material was dissolved in ethyl acetate and washed with an aqueous solution of sodium hydrogen carbonate and a solution of sodium chloride, followed by drying with magnesium sulfate and distillation of ethyl acetate to provide a crude crystal. This was recrystallized with methanol to provide a white crystal of neopentyl 3-(2,5-dichlorobenzoyl)benzenesulfonate, which is represented by the above formula.

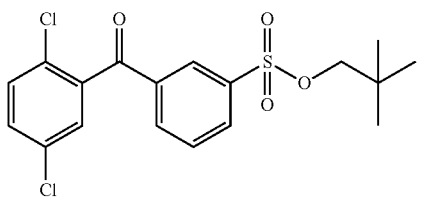

(G5)

Synthesis Example 6

Synthesis of Ionic Group-Free Oligomer, which is Represented by Formula (G6)

To a 1 L three neck flask equipped with a stirrer, thermometer, cooling tube, Dean-Stark tube, and three-way nitrogen supply cock, 49.4 g (0.29 mol) of 2,6-dichlorobenzonitrile, 88.4 g (0.26 mol) of 2,2-bis(4-hydroxyphenyl)-1,1,1,3,3,3-hexafluoropropane, and 47.3 g (0.34 mol) of potassium carbonate were weighed out. After nitrogen purging, 346 mL of sulfolane and 173 mL of toluene were added and stirred. The flask was immersed in an oil bath and heated under reflux at 150° C. When the reaction was performed while the water resulting from the reaction was subjected to azeotrope with toluene for its removal out of the system via the Dean-Stark tube, generation of water became almost undetectable in about 3 hours. After removal of most of the toluene by gradually increasing the reaction temperature, the reaction was continued at 200° C. for 3 hours. Then, 12.3 g (0.072 mol) of 2,6-dichlorobenzonitrile was added, and the reaction further continued for 5 hours.

After the resulting reaction solution was allowed to stand for cooling, 100 mL of toluene was added thereto for dilution. The precipitate of the by-product inorganic compounds was removed by filtration, and the filtrate poured into 2 L of methanol. The precipitated product was filtered, collected, dried, and dissolved in 250 mL of tetrahydrofuran. This was reprecipitated in 2 L of methanol to provide 107 g of the target compound, which is represented by formula (G6). Its number average molecular weight was 11,000.

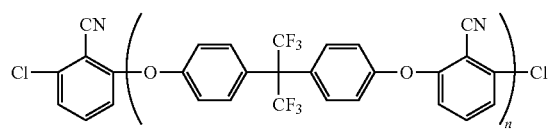

(G6)

Synthesis Example 7

Synthesis of Polyethersulfone (PES) Based Block Copolymer Precursor b2', which is Composed of the Segment Represented by Formula (G8) and the Segment Represented by Formula (G9)

First, 1.62 g of anhydrous nickel chloride and 15 mL of dimethylsulfoxide were mixed and maintained at 70° C. To this mixture, 2.15 g of 2,2'-bipyridyl was added and stirred at the same temperature for 10 minutes to prepare a nickel-containing solution.

A solution was prepared by dissolving 1.49 g of 2,5-dichlorobenzenesulfonic acid (2,2-dimethylpropyl) and 0.50 g of Sumica Excel PES5200P (manufactured by Sumitomo Chemical Co., Ltd., Mn=40,000, Mw=94,000), which is represented by formula (G7) in 5 mL of dimethylsulfoxide, and 1.23 g of zinc powder was added to this solution, followed by adjusting the temperature to 70° C. The aforementioned nickel-containing solution was poured into this solution, and polymerization reaction performed at 70° C. for 4 hours. The reaction mixture was added to 60 mL of methanol and, subsequently, 60 mL of 6 mol/L hydrochloric acid added and stirred for 1 hour. The deposited solid was separated by filtration and dried so that 1.62 g of a gray-white block copolymer precursor b2' composed of the segments represented by formula (G8) or formula (G9) was provided with a yield of 99%. Its weight average molecular weight was 230,000.

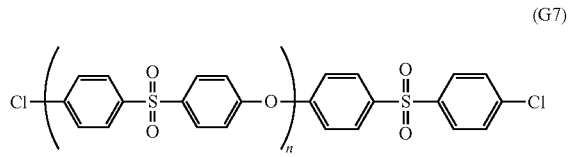

(G7)

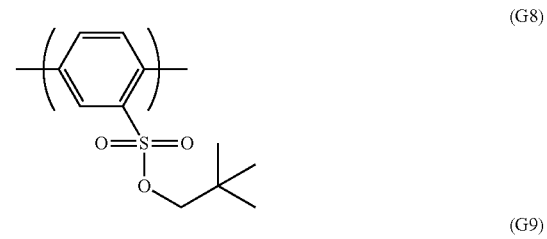

(G8)

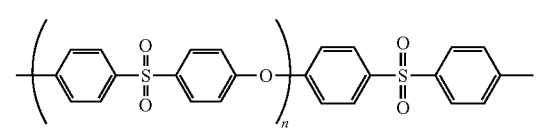

(G9)

Polymer electrolyte solution A: A polymer electrolyte solution containing a block copolymer composed of an oligomer as represented by formula (G4) as ionic group-containing segment and an oligomer as represented by formula (G3) as ionic group-free segment To a 500 mL three neck flask equipped with a stirrer, nitrogen supply tube, and Dean-Stark trap, 0.56 g of potassium carbonate (Aldrich reagent, 4 mmol) and 16 g (1 mmol) of the ionic group-containing oligomer a2 prepared in Synthesis Example 4 (with hydroxyl end group) were fed, followed by nitrogen purging, dehydration in 100 mL of N-methyl pyrrolidone (NMP) and 30 mL of cyclohexane at 100° C., heating to remove cyclohexane, addition of 11 g (1 mmol) of the ionic group-free oligomer a1 prepared in Synthesis Example 3 (with fluoro end group), and reaction at 105° C. for 24 hour. The material was purified by reprecipitation in a large amount of isopropyl alcohol to provide a block copolymer b 1. Its weight average molecular weight was 340,000.

The resulting block copolymer was dissolved in 5 wt % N-methyl pyrolidone (NMP) to prepare a solution, and the polymerization stock solution subjected to direct centrifugal separation in an Inverter Compact High-Speed Refrigerated Centrifuge manufactured by Kubota Manufacturing Corporation (Model 6930, equipped with an RA-800 angle rotor, 25° C., 30 minutes, centrifugal force 20,000 G). The precipitated solid material (cake) and the supernatant liquid (coating liquid) were able to be separated completely and the supernatant liquid was recovered. Then, it was subjected to distillation under reduced pressure while stirring at 80° C. and then subjected to pressure filtration through a 1 m polypropylene filter to provide a polymer electrolyte solution A. The polymer electrolyte solution A had a viscosity of 1300 mPa·s. Polymer electrolyte solution B: A polymer electrolyte solution containing a polyarylene based block copolymer, which is represented by formula (G10)

In a nitrogen atmosphere, 540 ml of dried N,N-dimethyl acetamide (DMAc) was added to a mixture of 135.0 g (0.336 mol) of neopentyl 3-(2,5-dichlorobenzoyl) benzenesulfonate, 40.7 g (5.6 mmol) of the ionic group-free oligomer synthesized in Synthesis Example 6, which is represented by formula (G6), 6.71 g (16.8 mmol) of 2,5-dichloro-4'-(1-imidazolyl) benzophenone, 6.71 g (10.3 mmol) of bis(triphenylphosphine)nickel dichloride, 35.9 g (0.137 mol) of triphenyl phosphine, 1.54 g (10.3 mmol) of sodium iodide, and 53.7 g (0.821 mol) of zinc.

The reaction system was heated while stirring (finally reaching 79° C.) and the reaction continued for 3 hours. During the reaction period, the viscosity increase in the reaction system was observed. The polymerization reaction solution was diluted with 730 mL of DMAc, stirred for 30 minutes, and filtered using Celite as a filter aid.

The filtrate was condensed in an evaporator and then 43.8 g (0.505 mol) of lithium bromide was added to the filtrate, followed by continuing reaction in a nitrogen atmosphere at an inner temperature of 110° C. for 7 hours. After the reaction, it was cooled to room temperature and poured into 4 L of acetone for solidification. The solidified product was collected by filtering, air-dried, crushed in a mixer, and washed with 1,500 mL of 1 N hydrochloric acid while stirring. After filtration, the product was rinsed with ion-exchanged water until the pH of the rinsing liquid reached 5 or larger and then dried at 80° C. overnight to provide 23.0 g of the target polyarylene based block copolymer. This deprotected polyarylene based block copolymer had a weight average molecular weight of 190,000. The resulting polyarylene based block copolymer was dissolved in an organic solvent composed of N-methyl-2-pyrolidone and methanol mixed at a ratio of 30/70 (mass %) to provide a polymer electrolyte solution B having a copolymer content of 0.1 g/g. The viscosity of the polymer electrolyte solution B was 1,200 mPa·s.

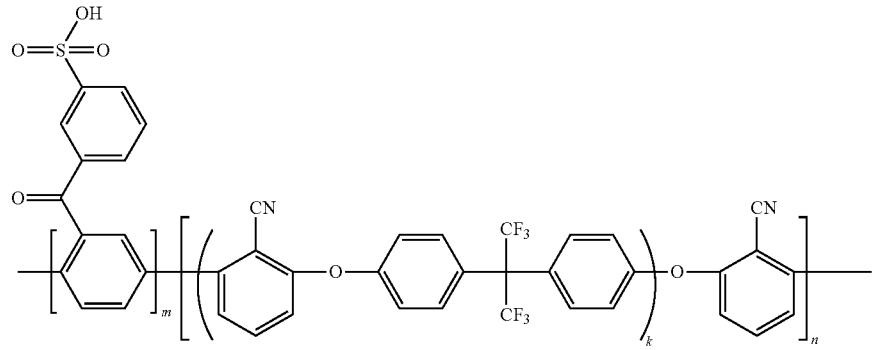

(G10)

Polymer Electrolyte Solution C: A Polymer Electrolyte Solution C Containing Random Copolymer To a 5 L reaction container equipped with a stirrer, nitrogen supply tube, and Dean-Stark trap, 129 g of the 2,2-bis(4-hydroxyphenyl)-1,3-dioxolane synthesized in Synthesis Example 1, 93 g of 4,4'-biphenol (Aldrich reagent), and 422 g (1.0 mol) of the disodium-3,3'-disulfonate-4,4'-difluorobenzophenone synthesized in Synthesis Example 2 were fed, followed by nitrogen purging and addition of 3,000 g of N-methyl-2-pyrolidone (NMP), 450 g of toluene, and 232 g of 18-crown-6 (manufactured by Wako Pure Chemical Industries, Ltd.). After confirming that the monomers had dissolved completely, 304 g of potassium carbonate (Aldrich reagent) was added, followed by dehydration under reflux at 160° C., heating to remove toluene, and desalting polycondensation at 200° C. for 1 hour. Its weight average molecular weight was 320,000.

Then, NMP was added to dilute the polymerization stock solution until its viscosity reached 500 mPa·s, and the polymerization stock solution was subjected to direct centrifugal separation in an Inverter Compact High-Speed Refrigerated Centrifuge manufactured by Kubota Manufacturing Corporation (Model 6930, equipped with an RA-800 angle rotor, 25° C., 30 minutes, centrifugal force 20,000 G). The precipitated solid material (cake) and the supernatant liquid (coating liquid) were able to be separated completely and so the supernatant liquid was recovered. Then, it was subjected to distillation under reduced pressure while stirring at 80° C. and the NMP was removed to adjust the polymer concentration to 20 wt %, followed by compression filtration through a 5 Lm polyethylene filter to provide a polymer electrolyte solution C. The viscosity of the polymer electrolyte solution C was 1,000 mPa·s.

Polymer Electrolyte Solution D: Polymer Electrolyte Solution D Containing a Polyethersulfone Based Block Copolymer First, 0.23 g of the block copolymer precursor b2' prepared in Synthesis Example 7 was added to a mixed solution of 0.16 g of lithium bromide monohydrate and 8 mL of NMP, and the mixture was allowed to react at 120° C. for 24 hours. The reaction mixture was poured into 80 mL of 6 mol/L hydrochloric acid for agitation for 1 hour. The deposited solid material was separated by filtration. The separated solid material was dried to provide a gray-white block copolymer b2 composed of a segment as represented by formula (G8) and a segment as represented by formula (G11). The weight average molecular weight of the resulting polyethersulfone based block copolymer was 190,000. The resulting polyethersulfone based block copolymer was dissolved in an organic solvent composed of N-methyl-2-pyrolidone and methanol mixed at a ratio of 30/70 (mass %) to provide a polymer electrolyte solution D having a copolymer content of 0.1 g/g. The viscosity of the polymer electrolyte solution D was 1300 mPa·s.

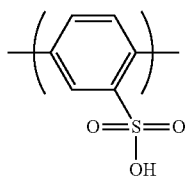

(G11)

Synthesis Example 8

Synthesis of Polybenzimidazole (PBI)

Polyphosphoric acid (PAA) was used as the polymerization solvent, and in a nitrogen atmosphere, 22.7 g (106 mmol) of 3,3'-diaminobenzidine (DAB) and 27.3 g (106 mmol) of 4,4'-oxybisbenzoic acid (OBBA) were weighed out and polyphosphoric acid (PPA) was added to prepare a 3 mass % solution, which was gradually heated while stirring, followed by continued stirring at 140° C. for 12 hours to perform condensation polymerization. After the reaction, it was cooled to room temperature, poured into ion-exchanged water to undergo coagulation, and neutralized with an aqueous sodium hydroxide solution. It was then filtered, washed with ion-exchanged water, and dried overnight at 80° C. under reduced pressure to provide the target polybenzimidazole. Its weight average molecular weight was 420,000 and its Tg was 427° C.

Synthesis Example 9

Synthesis of Polybenzoxazole (PBO)

Polyphosphoric acid (PAA) was used as the polymerization solvent, and in a nitrogen atmosphere, 31.7 g (106 mmol) of 3,3'-diamino-4,4'-dihydroxybiphenyl dihydrochloride and 27.3 g (106 mmol) of 4,4'-oxybisbenzoic acid (OBBA) were weighed out and polyphosphoric acid (PPA) was added to prepare a 10 mass % solution, which was gradually heated while stirring, followed by continued stirring at 140° C. for 12 hours to perform condensation polymerization. After the reaction, it was cooled to room temperature, poured into ion-exchanged water to undergo coagulation, and then neutralized with an aqueous sodium hydroxide solution. It was then filtered, washed with ion-exchanged water, and dried overnight at 80° C. under reduced pressure to provide the target polybenzoxazole. Its weight average molecular weight was 380,000 and its Tg was 416° C.

Nanofiber Nonwoven Fabric a Containing Polybenzimidazole Fibers

The polybenzimidazole prepared in Synthesis Example 8 was dissolved in dimethyl sulfoxide (DMSO) to produce an 8 wt % solution, which was then spun by an electrospinning unit manufactured by Kato Tech Co., Ltd. under the conditions of a voltage of 20 kV, syringe pump discharge speed of 0.12 mL/h, and syringe-to-target distance of 100 mm to prepare a nanofiber nonwoven fabric. The resulting nanofiber nonwoven fabric was dried under reduced pressure at 80° C. for 1 hour and spread over a Kapton (registered trademark) base with a thickness of 125 μm, followed by heating in a nitrogen atmosphere at 400° C. for 10 minutes to provide a polybenzimidazole fiber based nanofiber nonwoven fabric A with a fiber diameter of 150 nm and a thickness of 7 μm. Its porosity was 87%.

Nanofiber Nonwoven Fabric B Containing Polybenzoxazole Fibers

Except that the polybenzoxazole prepared in Synthesis Example 9 was used instead of polybenzimidazole, a polybenzoxazole fiber based nanofiber nonwoven fabric B with a fiber diameter of 160 nm and a thickness of 8 μm was produced by the same procedure as used for the above production of a polybenzimidazole fiber based nanofiber nonwoven fabric A. Its porosity was 86%.

Nanofiber Nonwoven Fabric C Containing Phosphoric Acid Doped Polybenzimidazole Fibers According to Japanese Unexamined Patent Publication (Kokai) No. 2015-28850, a nanofiber nonwoven fabric A (0.10 g) containing polybenzimidazole fibers was immersed in a 60 wt % aqueous phosphoric acid solution. After immersion at room temperature for 1 hour, it was vacuum-dried at 110° C. for 12 hours to provide a nanofiber nonwoven fabric C containing phosphoric acid doped polybenzimidazole fibers. Immediately after the drying step, the nanofiber nonwoven fabric had a weight of 0.13 g, a fiber diameter of 170 nm, a thickness of 8 μm, and a porosity of 83%.

Nanofiber Nonwoven Fabric D Containing Polyimide Fibers

Except that a commercially available 12 wt % solution of poly(pyromellitic dianhydride-CO-oxydianiline)amic acid (solvent 80 wt % NMP/20 wt % toluene, manufactured by Aldrich) was used instead of a 8 wt % polybenzimidazole solution, a polyimide fiber based nanofiber nonwoven fabric D with a fiber diameter of 160 nm and a thickness of 8 m was produced by the same procedure as used for the above production of a polybenzimidazole fiber based nanofiber nonwoven fabric A. Its porosity was 89%. After heat treatment, the resulting polyimide nonwoven fabric had a Tg of 410° C.

Nanofiber Nonwoven Fabric E Containing Polybenzimidazole Fibers Heat-Treated at a Temperature of 450° C.

Except that the as-prepared nonwoven fabric was heated in a nitrogen atmosphere at a temperature of 450° C., a polybenzimidazole fiber based nanofiber nonwoven fabric E with a fiber diameter of 150 nm and a thickness of 8 m was produced by the same procedure as used for the above production of a polybenzimidazole fiber based nanofiber nonwoven fabric A. Its porosity was 88%.

Nanofiber Nonwoven Fabric F Containing Polybenzimidazole Fibers Heat-Treated at a Temperature of 350° C.

Except that the as-prepared nonwoven fabric was heated in a nitrogen atmosphere at a temperature of 350° C., a polybenzimidazole fiber based nanofiber nonwoven fabric F with a fiber diameter of 150 nm and a thickness of 8 m was produced by the same procedure as used for the above production of a polybenzimidazole fiber based nanofiber nonwoven fabric A. Its porosity was 86%.

Nanofiber Nonwoven Fabric G Containing Polybenzimidazole Fibers Heat-Treated at a Temperature of 500° C.

Except that the as-prepared nonwoven fabric was heated in a nitrogen atmosphere at temperature of 500° C., a polybenzimidazole fiber based nanofiber nonwoven fabric G with a fiber diameter of 150 nm and a thickness of 8 m was produced by the same procedure as used for the above production of a polybenzimidazole fiber based nanofiber nonwoven fabric A. Its porosity was 88%.

Example 1

The polymer electrolyte solution A was flow-cast on a glass substrate using a knife coater, and combined with a nanofiber nonwoven fabric A containing polybenzimidazole fibers. It was left at room temperature for 1 hour to ensure full impregnation of the nanofiber nonwoven fabric A with the polymer electrolyte solution A and then dried at 100° C. for 4 hours. The polymer electrolyte solution A was flow-cast again over the top face of the dried membrane, maintained at room temperature for 1 hour, and dried at 100° C. for 4 hours to provide a film-like polymer. It was immersed in a 10 wt % aqueous sulfuric acid solution at 80° C. for 24 hours for proton substitution and deprotection reaction and then immersed in a large excess of pure water for 24 hours to ensure adequate washing to provide a composite polymer electrolyte membrane (membrane thickness 11 μm).

Example 2

Except for using the nanofiber nonwoven fabric B containing polyoxazole fibers instead of the nanofiber nonwoven fabric A containing polybenzimidazole fibers, the same procedure as in Example 1 was carried out to provide a composite polymer electrolyte membrane (membrane thickness 12 μm).

Example 3

Except for using the polymer electrolyte solution B instead of the polymer electrolyte solution A, the same procedure as in Example 1 was carried out to provide a composite polymer electrolyte membrane (membrane thickness 12 μm).

Example 4

Except for using the polymer electrolyte solution C instead of the polymer electrolyte solution A, the same procedure as in Example 1 was carried out to provide a composite polymer electrolyte membrane (membrane thickness 12 μm).

Example 5

Except for using the polymer electrolyte solution D instead of the polymer electrolyte solution A, the same procedure as in Example 1 was carried out to provide a composite polymer electrolyte membrane (membrane thickness 12 μm).

Example 6

Except for using a 10 wt % dispersion liquid of a commercially available product (Nafion, manufactured by Aidrich, available acid capacity 0.92 meq/g) (hereinafter referred to as polymer electrolyte solution E) instead of the polymer electrolyte solution A, the same procedure as in Example 1 was carried out to provide a composite polymer electrolyte membrane (membrane thickness 12 μm).

Comparative Example 1

Except for using the nanofiber nonwoven fabric C containing phosphoric acid doped polybenzimidazole fibers instead of the nanofiber nonwoven fabric A containing polybenzimidazole fibers, the same procedure as in Example 1 was carried out to provide a composite polymer electrolyte membrane (membrane thickness 12 μm).

Comparative Example 2

Except for using the nanofiber nonwoven fabric D containing polyimide fibers instead of the nanofiber nonwoven fabric A containing polybenzimidazole fibers, the same procedure as in Example 1 was carried out to provide a composite polymer electrolyte membrane (membrane thickness 12 μm).

Comparative Example 3

The polymer electrolyte solution A was flow-cast on a glass substrate using a knife coater. Then, omitting the step of combining it with a nanofiber nonwoven fabric (A) containing polyazole fibers, it was dried at 100° C. for 4 hours to provide a film-like polymer. It was immersed in a 10 wt % aqueous sulfuric acid solution at 80° C. for 24 hours for proton substitution and deprotection reaction and then immersed in a large excess of pure water for 24 hours to ensure adequate washing to provide a composite polymer electrolyte membrane (membrane thickness 10 μm).

Comparative Example 4

Except for using the polymer electrolyte solution B instead of the polymer electrolyte solution A, the same procedure as in Comparative Example 3 was carried out to provide a composite polymer electrolyte membrane (membrane thickness 12 μm).

Comparative Example 5

Except for using the polymer electrolyte solution C instead of the polymer electrolyte solution A, the same procedure as in Comparative Example 3 was carried out to provide a composite polymer electrolyte membrane (membrane thickness 12 μm).

Comparative Example 6

Except for using the polymer electrolyte solution D instead of the polymer electrolyte solution A, the same procedure as in Comparative Example 3 was carried out to provide a composite polymer electrolyte membrane (membrane thickness 12 μm).

Comparative Example 7

Except for using the polymer electrolyte solution E instead of the polymer electrolyte solution A, the same procedure as in Comparative Example 3 was carried out to provide a composite polymer electrolyte membrane (membrane thickness 12 µm).

Reference Example 1

Except for using the nanofiber nonwoven fabric E containing polybenzimidazole fibers heat-treated at a temperature of 450° C. instead of the nanofiber nonwoven fabric A containing polybenzimidazole fibers, the same procedure as in Example 1 was carried out in an attempt to produce a composite polymer electrolyte membrane. However, the nonwoven fabric had been cured excessively and become so brittle that the nonwoven fabric was damaged when combined with the polymer electrolyte solution A, failing to form a composite polymer electrolyte membrane.

Reference Example 2

Except for using the nanofiber nonwoven fabric F containing polybenzimidazole fibers heat-treated at a temperature of 350° C. instead of the nanofiber nonwoven fabric A containing polybenzimidazole fibers, the same procedure as in Example 1 was carried out in an attempt to produce a composite polymer electrolyte membrane. However, the nonwoven fabric shrank in the heating and drying steps, failing to form a composite polymer electrolyte membrane.

Reference Example 3

Except for using the nanofiber nonwoven fabric G containing polybenzimidazole fibers heat-treated at a temperature of 500° C. instead of the nanofiber nonwoven fabric A containing polybenzimidazole fibers, the same procedure as in Example 1 was carried out in an attempt to produce a composite polymer electrolyte membrane. However, the nonwoven fabric had been cured excessively and become so brittle that the nonwoven fabric was damaged when combined with the polymer electrolyte solution A, failing to form a composite polymer electrolyte membrane.

Evaluations of the composite polymer electrolyte membrane samples prepared in the Examples and Comparative Examples were carried out in terms of ion exchange capacity (IEC), rate of filling with polymer electrolyte in the composite layer, dimensional change rate $\lambda_{xy}$, degree of proton conductivity, and durability against dry-wet cycles. The ionic group-containing polymer membrane in each composite polymer electrolyte membrane was examined to show whether it had a phase separated structure and determine the morphology and average interdomain distance of the phase separated structure, and evaluations of the nanofiber nonwoven fabrics were carried out in terms of the fiber diameter, porosity, crystal structure (half-width 2θ) analyzed by X-ray diffraction (XRD), absorption spectrum (Kubelka-Munk function), and emission spectrum (I450/I300). These evaluation results are given in Table 1. (In Table 1, the symbol - in the column for phase separated structure means that no definite phase separated structures were found. In the evaluation for the durability against dry-wet cycles, the evaluation test was terminated when the number of cycles reached 30,000 in the case where the hydrogen permeation current did not exceed ten times the initial electric current for all the 30,000 cycles.)

TABLE 1

| | Ionic group-containing polymer electrolyte (B) | | | Polyazole-containing nanofiber nonwoven fabric (A) | | | | | |
|---|---|---|---|---|---|---|---|---|---|
| | Type of polymer electrolyte solution | Feature of phase separated structure | Average inter-domain distance in phase separated structure (nm) | Type of nano-fiber non-woven fabric | Fiber diameter (nm) | Pore size (nm) | Porosity (%) | XRD half-width (2θ°) | Kubelka-munk function for absorption at 450 nm |
| Example 1 | A | co-continuous | 23 | A | 150 | 560 | 87 | 12.4 | 0.5 |
| Example 2 | A | co-continuous | 25 | B | 160 | 630 | 86 | 11.8 | 0.42 |
| Example 3 | B | lamellar | 400 | A | 150 | 560 | 87 | 12.4 | 0.5 |
| Example 4 | C | — | — | A | 150 | 560 | 87 | 12.4 | 0.5 |
| Example 5 | D | co-continuous | 24 | A | 150 | 560 | 87 | 12.4 | 0.5 |
| Example 6 | E | — | — | A | 150 | 560 | 87 | 12.4 | 0.5 |
| Comparative Example 1 | A | co-continuous | 32 | C | 170 | 530 | 83 | 8.7 | 0.18 |
| Comparative Example 2 | A | co-continuous | 24 | D | 160 | 610 | 89 | 10.1 | 0.76 |
| Comparative Example 3 | A | co-continuous | 24 | — | — | — | — | — | — |
| Comparative Example 4 | B | lamellar | 400 | — | — | — | — | — | — |
| Comparative Example 5 | C | — | — | — | — | — | — | — | — |
| Comparative Example 6 | D | co-continuous | 24 | — | — | — | — | — | — |
| Comparative Example 7 | E | — | — | — | — | — | — | — | — |
| Reference Example 1 | A | — | — | E | 150 | 540 | 88 | 13.2 | 3.53 |
| Reference Example 2 | A | — | — | F | 150 | 590 | 86 | 13.2 | 0.31 |
| Reference Example 3 | A | — | — | G | 150 | 510 | 88 | 12 | 7.36 |

TABLE 1-continued

| | Polyazole-containing nanofiber nonwoven fabric (A) Emission I450/I300 | Composite polymer electrolyte membrane | | | | |
|---|---|---|---|---|---|---|
| | | Ion exchange capacity IEC (meq/g) | Filling rate (%) | Dimensional change rate λxy (%) | Degree of proton conduction (mS/cm) | Durability against dry-wet cycles (number of cycles) |
| Example 1 | 0.42 | 1.89 | 85 | 4 | 2.6 | >30,000 |
| Example 2 | 0.36 | 1.84 | 83 | 6 | 2.5 | >30,000 |
| Example 3 | 0.42 | 1.68 | 84 | 7 | 0.8 | >30,000 |
| Example 4 | 0.42 | 1.79 | 82 | 8 | 0.5 | 17,000 |
| Example 5 | 0.42 | 1.59 | 83 | 5 | 0.7 | >30,000 |
| Example 6 | 0.42 | 0.85 | 76 | 6 | 2.2 | >30,000 |
| Comparative Example 1 | 0.18 | 1.84 | 80 | 5 | 2.9 | 9,000 |
| Comparative Example 2 | 1.49 | 1.96 | 87 | 9 | 2.6 | 17,000 |
| Comparative Example 3 | — | 2.22 | — | 21 | 2.8 | 25,000 |
| Comparative Example 4 | — | 1.97 | — | 24 | 1.0 | 21,000 |
| Comparative Example 5 | — | 2.12 | — | 41 | 0.6 | 3,000 |
| Comparative Example 6 | — | 1.99 | — | 22 | 0.9 | 23,000 |
| Comparative Example 7 | — | 0.93 | — | 18 | 2.4 | 26,000 |
| Reference Example 1 | no peak | — | — | — | — | — |
| Reference Example 2 | 0.2 | — | — | — | — | — |
| Reference Example 3 | no peak | — | — | — | — | — |

The invention claimed is:

1. A composite polymer electrolyte membrane comprising a composite layer composed mainly of a polyazole-containing nanofiber nonwoven fabric (A) and an ionic group-containing polymer electrolyte (B), the polyazole-containing nanofiber nonwoven fabric (A) being basic, and
   wherein the polyazole-containing nanofiber nonwoven fabric (A), examined by emission spectrum analysis, shows a ratio (I450/I300) of 0.30 or more and 1.4 or less, and I450 and I300 are the peak intensities determined under excitation at 450 nm and 300 nm, respectively.

2. The composite polymer electrolyte membrane as set forth in claim 1, wherein the polyazole-containing nanofiber nonwoven fabric (A) is a polybenzazole based nanofiber nonwoven fabric.

3. The composite polymer electrolyte membrane as set forth in claim 1, wherein the polyazole-containing nanofiber nonwoven fabric (A) is a nanofiber nonwoven fabric containing polybenzimidazole fibers.

4. The composite polymer electrolyte membrane as set forth in claim 1, wherein polyazole accounts for 80 wt % or more of the polyazole-containing nanofiber nonwoven fabric (A).

5. The composite polymer electrolyte membrane as set forth claim 1, wherein the polyazole-containing nanofiber nonwoven fabric (A) shows a weight change rate of 50% or less after staying in N-methyl-2-pyrolidone at 30° C. for 1 hour.

6. The composite polymer electrolyte membrane as set forth in claim 1, wherein the ionic group-containing polymer electrolyte (B) is an ionic group-containing aromatic hydrocarbon based polymer.

7. The composite polymer electrolyte membrane as set forth in claim 1, wherein the ionic group-containing polymer electrolyte (B) is a block copolymer comprising at least one ionic group-containing segment (B1) and at least one ionic group-free segment (B2).

8. The composite polymer electrolyte membrane as set forth in claim 7, wherein the ionic group-containing polymer electrolyte (B) forms a co-continuous type phase separated structure.

9. A catalyst coated membrane comprising a catalyst layer formed on the composite polymer electrolyte membrane as set forth in claim 1.

10. A membrane electrode assembly comprising the composite polymer electrolyte membrane as set forth in claim 1.

11. A solid polymer electrolyte fuel cell comprising the composite polymer electrolyte membrane as set forth in claim 1.

12. An electrochemical hydrogen pump comprising the composite polymer electrolyte membrane as set forth in claim 1.

13. Water electrolysis hydrogen generation equipment comprising the composite polymer electrolyte membrane as set forth in claim 1.

14. A polyazole-containing nanofiber nonwoven fabric that, when examined by emission spectrum analysis, has a ratio (I450/I300) of 0.30 or more and 1.4 or less wherein I450 and I300 are the peak intensities determined under excitation at 450 nm and 300 nm, respectively.

15. The polyazole-containing nanofiber nonwoven fabric as set forth in claim 14 having a polyazole content of 80 wt % or more and a weight change rate of 50% or less after contact with N-methyl-2-pyrolidone at 30° C. for 1 hour.

16. A method of producing polyazole-containing nanofiber nonwoven fabric that, when examined by emission spectrum analysis, shows a ratio (I450/I300) of 0.30 or more and 1.4 or less, and I450 and I300 are the peak intensities determined under excitation at 450 nm and 300 nm, respectively, comprising:

step 1 dissolving polymers used as materials for the polyazole-containing nanofiber nonwoven fabric, step 2 producing a nanofiber nonwoven fabric precursor by electrospinning of the solution resulting from step 1, and step 3 performing insolubilization treatment of the nanofiber nonwoven fabric precursor resulting from step 2.

17. The method as set forth in claim 16, wherein the insolubilization treatment in step 3 comprises heat treatment at a temperature T(° C.) that meets equation (F1):

$$Tg1-50(°\ C.) \leq T \leq Tg1+20(°\ C.) \tag{F1}$$

wherein Tg1 denotes the glass transition temperature (° C.) of the polyazole contained in the polyazole-containing nanofiber nonwoven fabric.

18. The method as set forth in claim 16, wherein the insolubilization treatment in step 3 comprises heat treatment performed after spreading a polyazole-containing nanofiber nonwoven fabric on a base having a glass transition temperature Tg2 (° C.) meeting equation (F2) and/or a melting point Tm (° C.):

$$Tg2(Tm) > T \tag{F2}$$

wherein, Tg2 is the glass transition temperature (° C.) of the substance of the base and Tm(° C.) is the melting point of the substance of the base.

* * * * *